United States Patent
Mishimagi

(10) Patent No.: US 7,204,543 B2
(45) Date of Patent: Apr. 17, 2007

(54) VEHICLE SIDE VISOR COVER

(75) Inventor: Kazuharu Mishimagi, Tokyo (JP)

(73) Assignee: E'Sam Co., Ltd., Tokyo (JP)

( * ) Notice: Subject to any disclaimer, the term of this patent is extended or adjusted under 35 U.S.C. 154(b) by 0 days.

(21) Appl. No.: 10/553,048

(22) PCT Filed: Jul. 22, 2004

(86) PCT No.: PCT/JP2004/010393

§ 371 (c)(1),
(2), (4) Date: Oct. 12, 2005

(87) PCT Pub. No.: WO2005/070714

PCT Pub. Date: Aug. 4, 2005

(65) Prior Publication Data

US 2006/0208530 A1    Sep. 21, 2006

(30) Foreign Application Priority Data

Jan. 22, 2004   (JP) ............................. 2004-013750

(51) Int. Cl.
*B60J 1/20* (2006.01)
*B60Q 1/32* (2006.01)
(52) U.S. Cl. .................. 296/152; 362/501; 362/503
(58) Field of Classification Search ............ 296/146.1, 296/152, 154; 362/459, 487, 501, 503
See application file for complete search history.

(56) References Cited

U.S. PATENT DOCUMENTS 1,637,528 A * 8/1927 Liebrich ................... 362/540
2,251,511 A * 8/1941 Burke ...................... 454/131
D148,831 S * 2/1948 Wagner .................... D12/190

(Continued)

FOREIGN PATENT DOCUMENTS

FR    2591951 A1 * 6/1987 ................ 296/154

(Continued)

*Primary Examiner*—D. Glenn Dayoan
*Assistant Examiner*—Paul Chenevert
(74) *Attorney, Agent, or Firm*—Reed Smith LLP

(57) ABSTRACT

A side visor is effectively utilized to perform sufficient ventilation in a car.

A cover is attached on a vehicle side visor 21 provided along a window frame 14 of a vehicle door. The cover 31 comprises: a cover attachment portion 32 which can be attached on an outer surface of the side visor and has a lower edge along a lower edge of the side visor; a tabular sealing portion 33 whose outer rim is integrally connected with the lower edge of the cover attachment portion and whose inner rim faces a rolled-up window glass 13; and an elastic material 34 which is attached on the inner rim of the sealing portion and formed to come into contact with an outer surface of the rolled-up window glass. The sealing portion 33 may comprise a first sealing plate and a second sealing plate which is superimposed and attached on the first sealing plate so as to be capable of moving in a car widthwise direction. On the other hand, the sealing portion may be formed in a curve in such a manner that it declines as getting close to the rolled-up window glass of the door. Further, a lamp 36 may be attached on the cover attachment portion or the like.

8 Claims, 18 Drawing Sheets

U.S. PATENT DOCUMENTS

| | | | |
|---|---|---|---|
| 4,527,466 A * | 7/1985 | Kossor et al. | 454/133 |
| 4,558,633 A * | 12/1985 | Lingg | 454/131 |
| 5,251,953 A * | 10/1993 | Willey | 296/152 |
| 5,460,425 A * | 10/1995 | Stephens | 296/152 |
| 5,797,645 A * | 8/1998 | Schenk et al. | 296/152 |
| 6,350,195 B1 * | 2/2002 | Iino | 454/131 |
| 7,114,761 B2 * | 10/2006 | Kodama et al. | 296/152 |

FOREIGN PATENT DOCUMENTS

| | | |
|---|---|---|
| JP | 09-168601 | 6/1998 |
| JP | 2000-032684 | 8/2001 |
| JP | 2001-322425 | 8/2001 |
| JP | 3084013 | 11/2001 |
| JP | 2003-312255 | 6/2003 |

* cited by examiner

[Fig. 1]
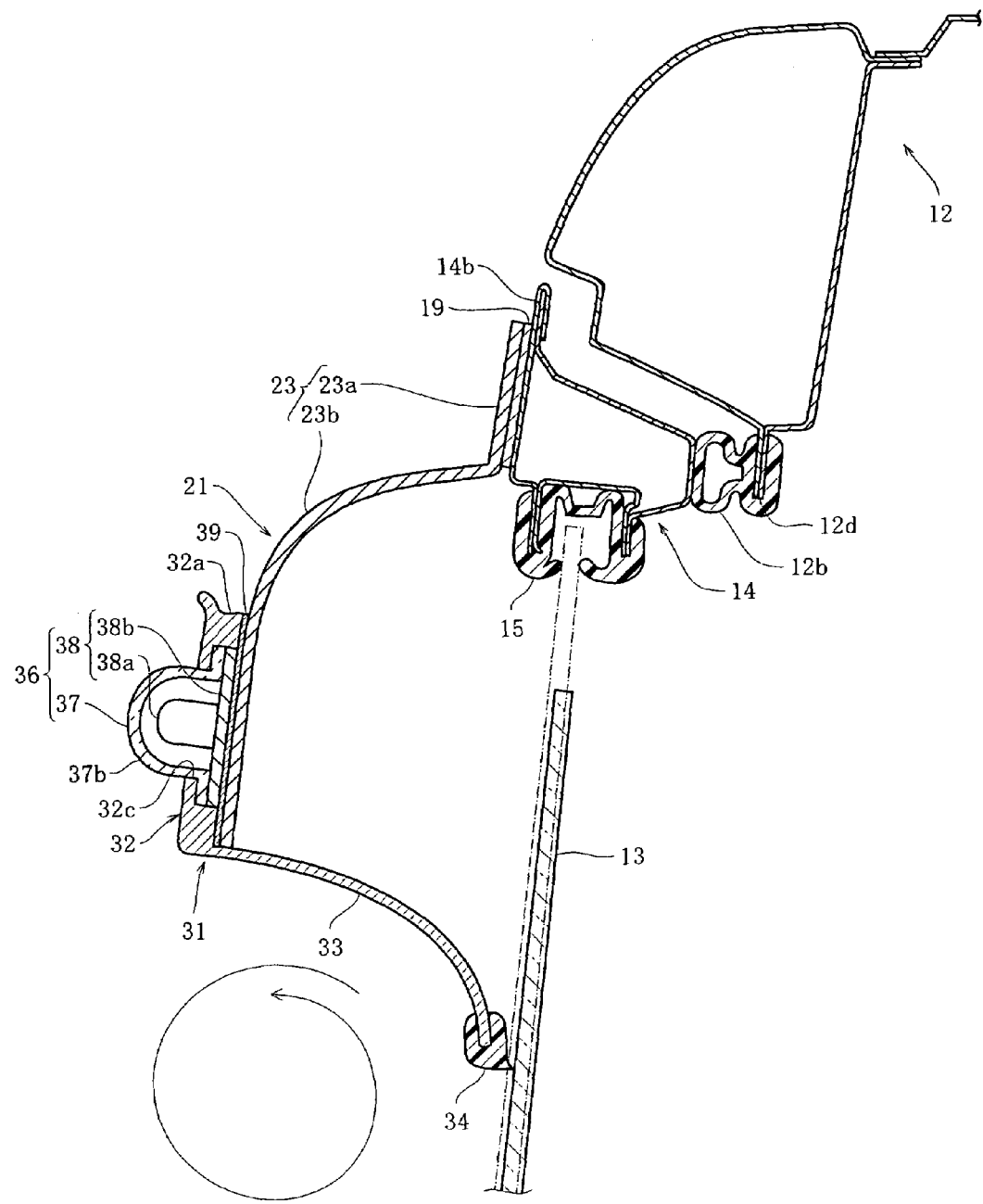

[Fig. 2]
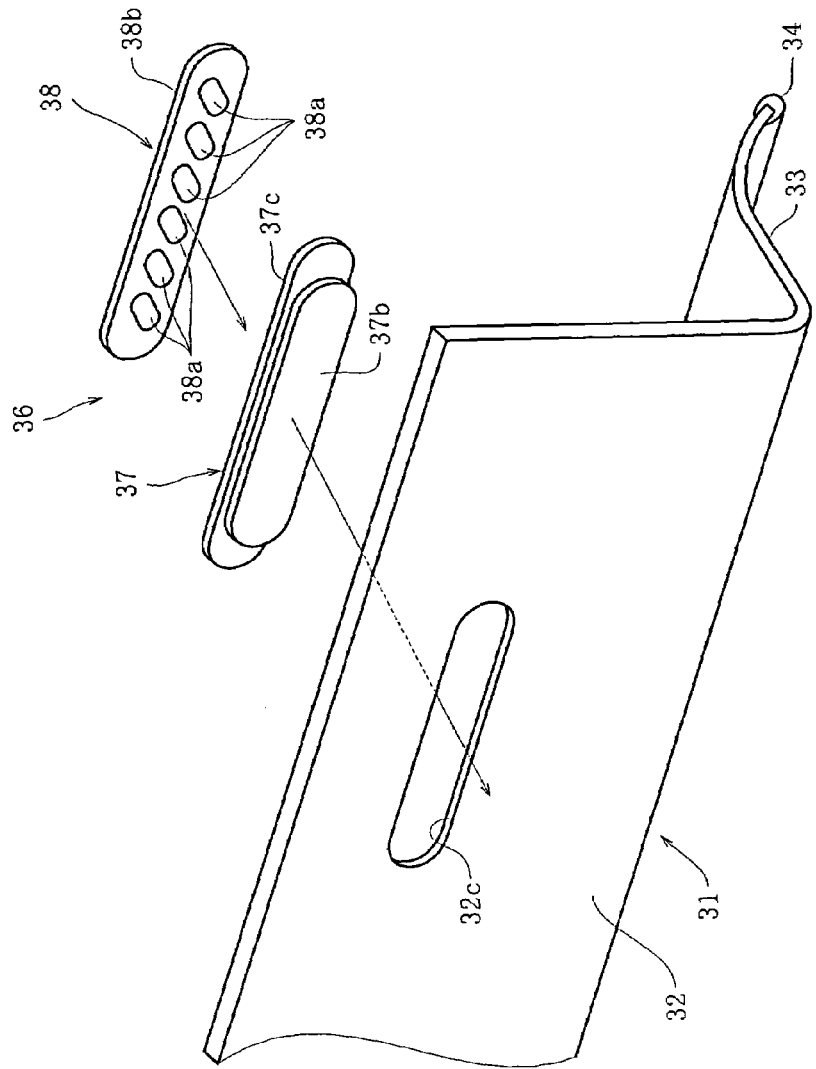

[Fig. 3]
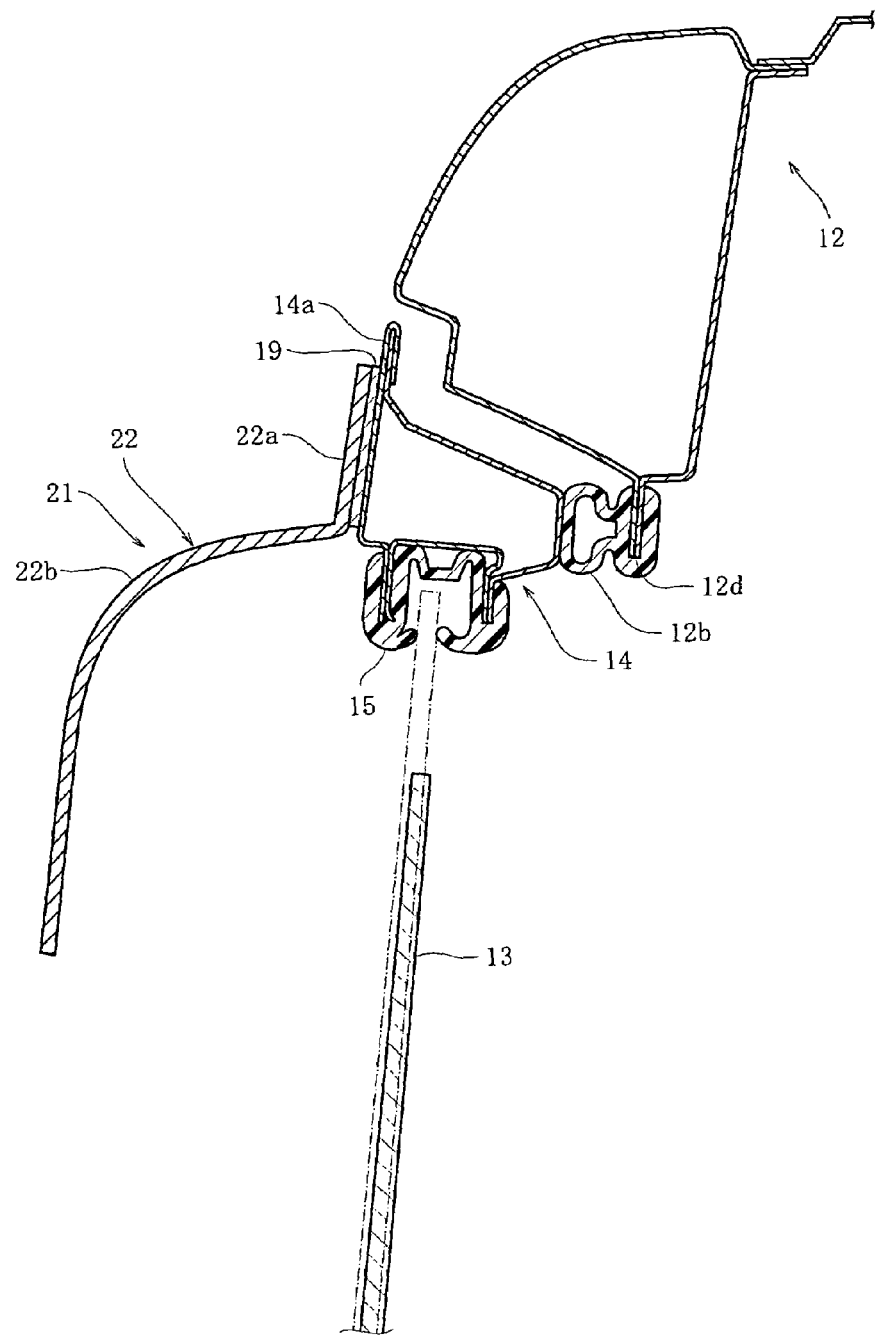

[Fig. 4]
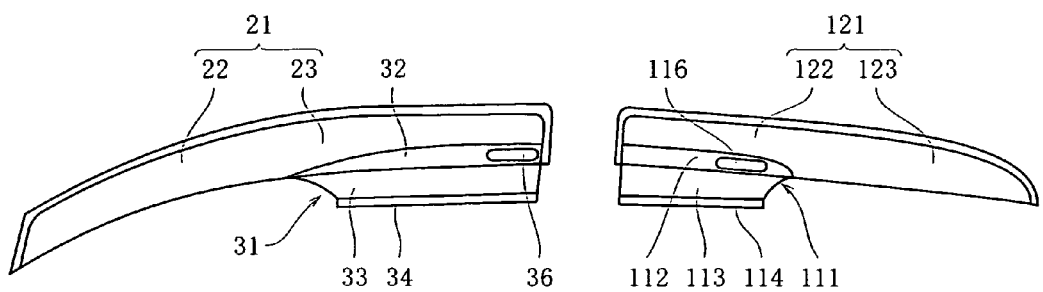
[Fig. 5]
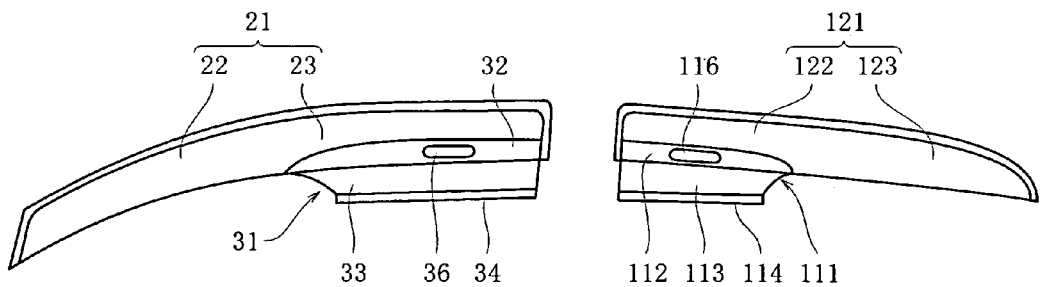
[Fig. 6]
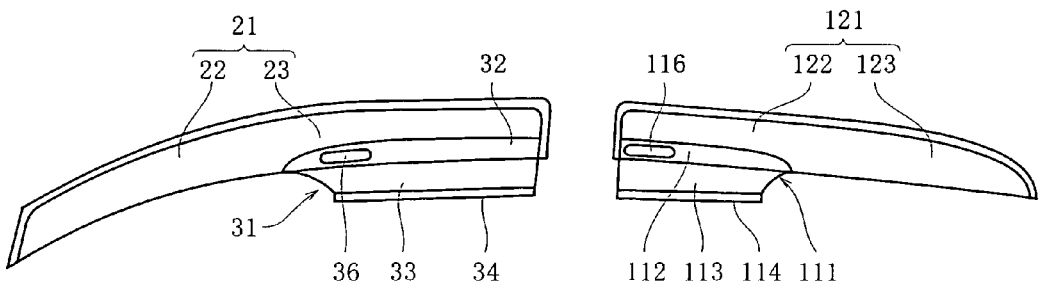

[Fig. 7]
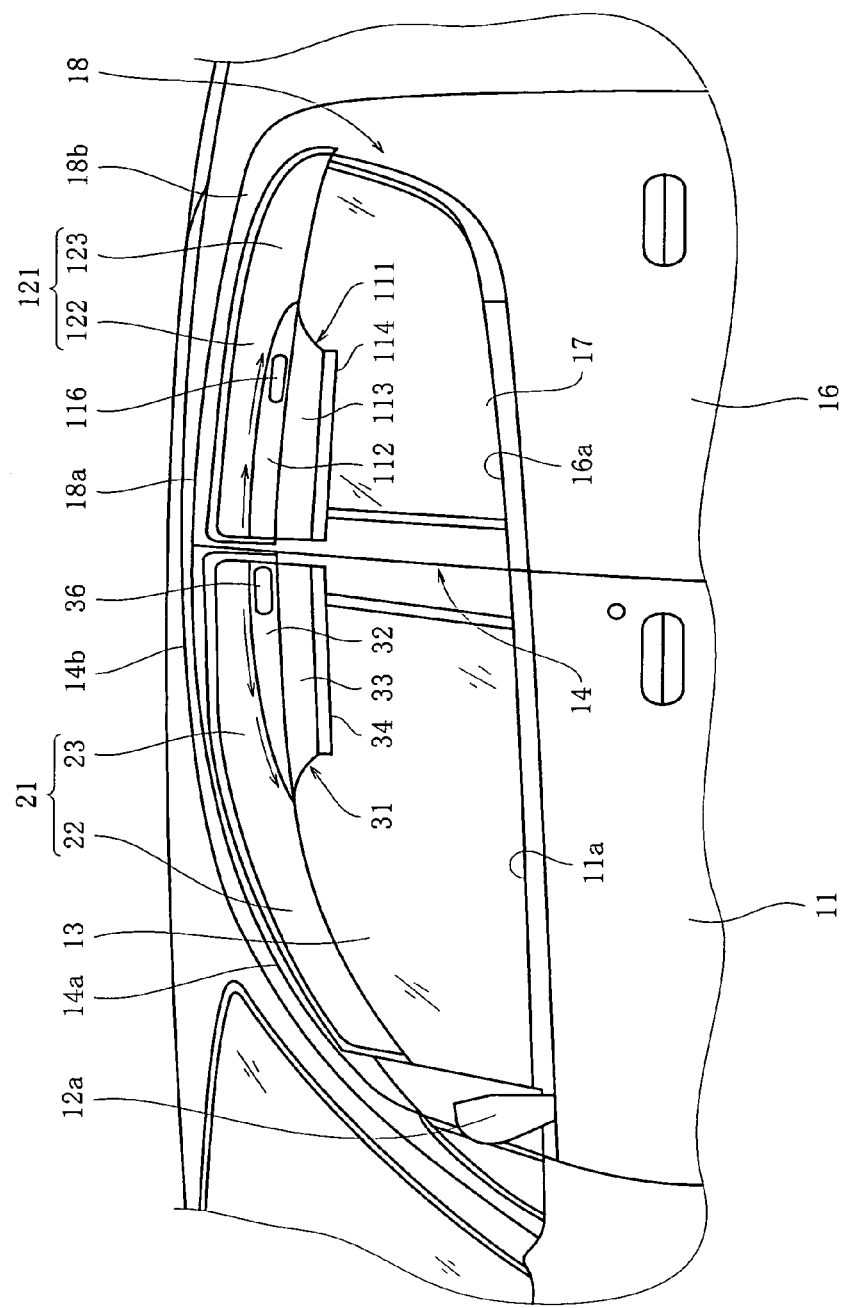

[Fig. 8]
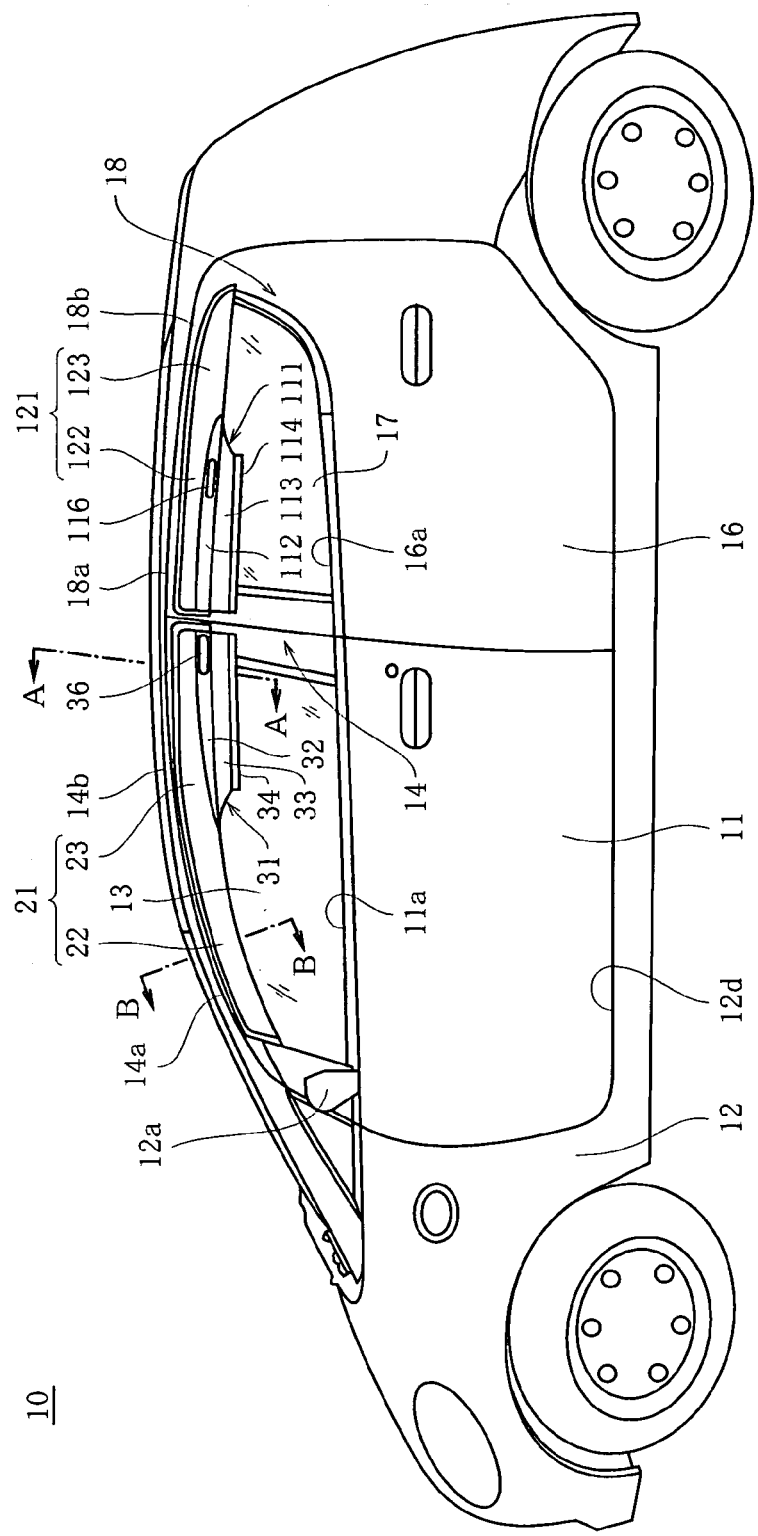

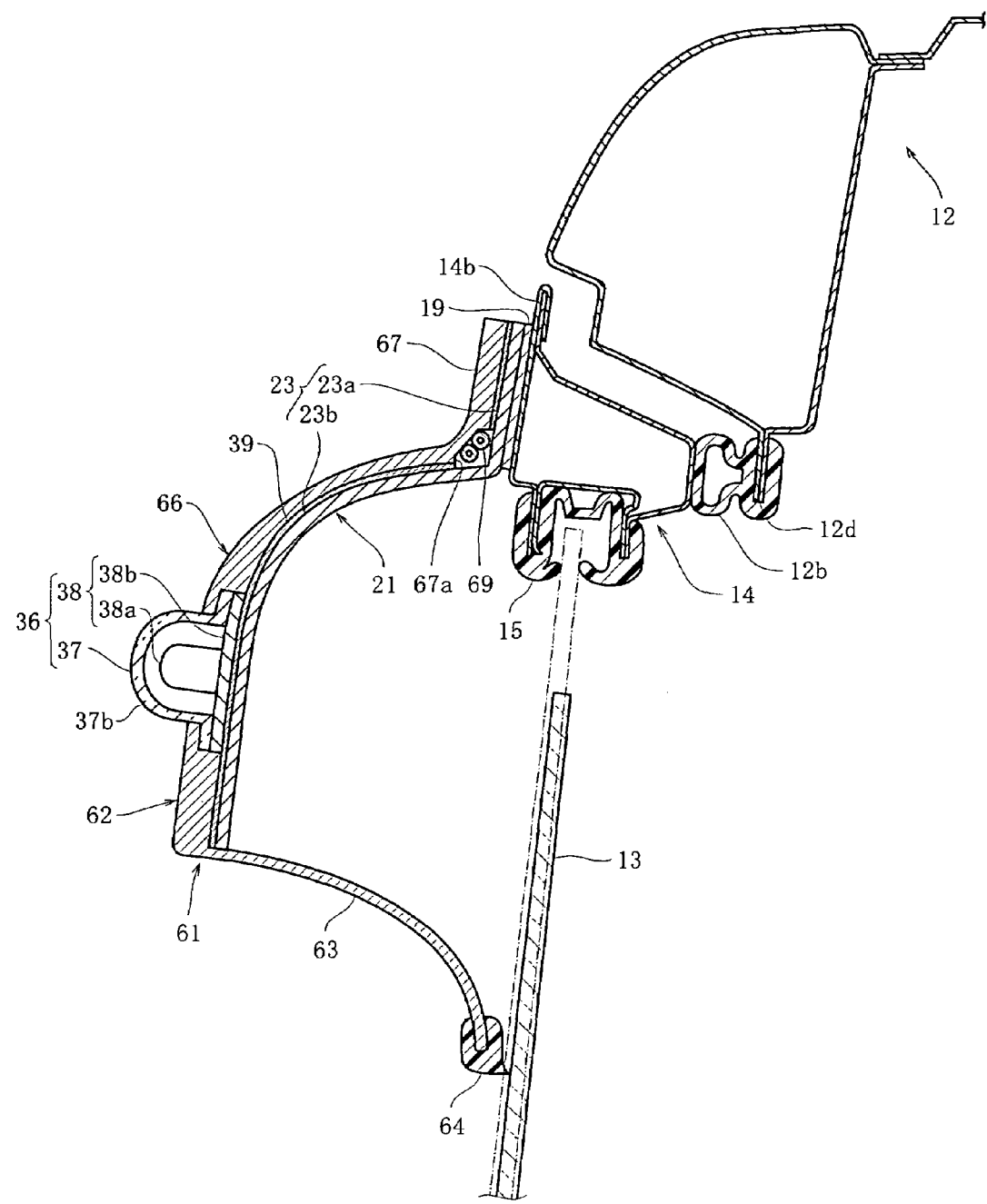
[Fig. 9]

[Fig. 10]
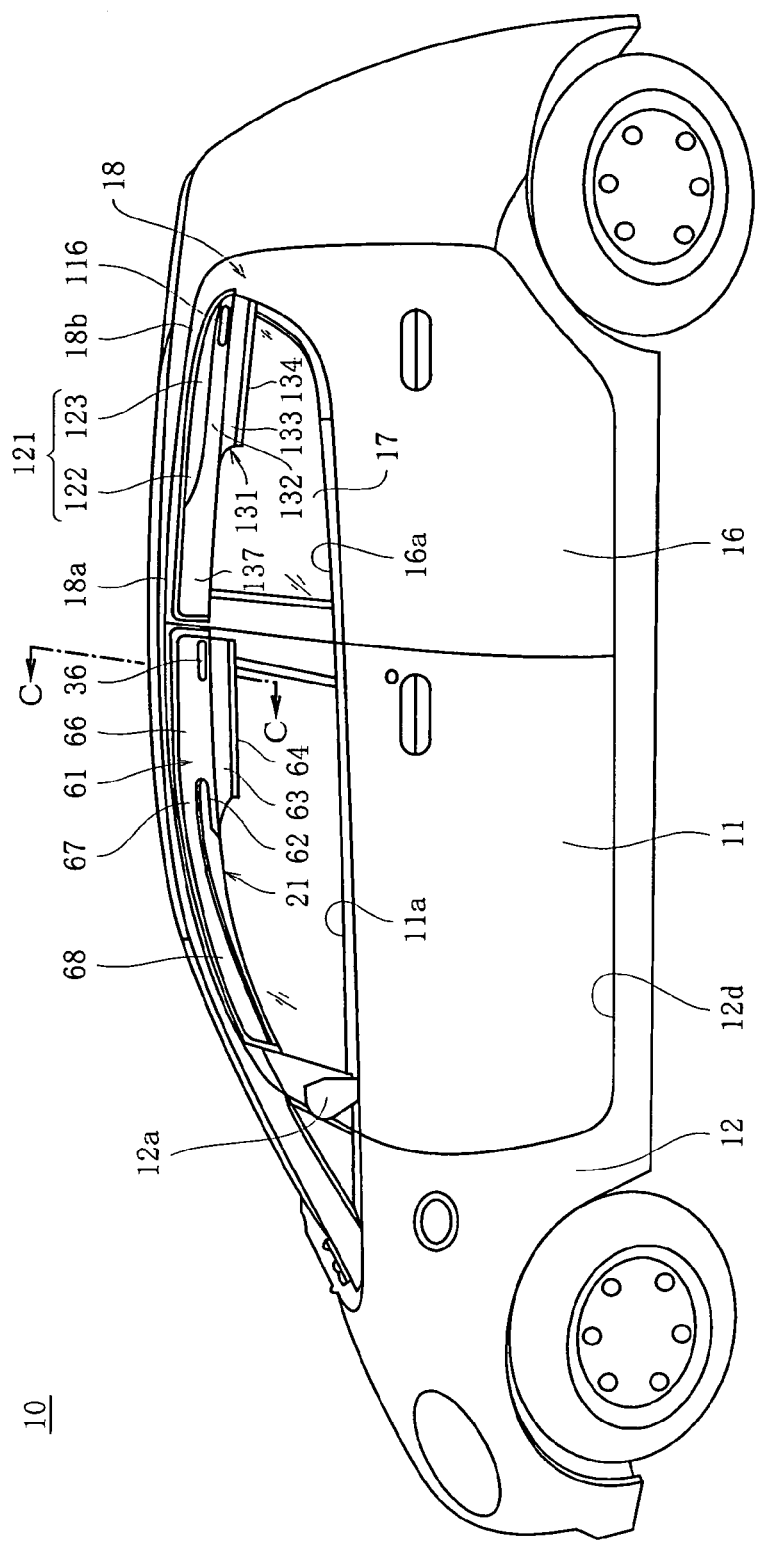

[Fig. 11]
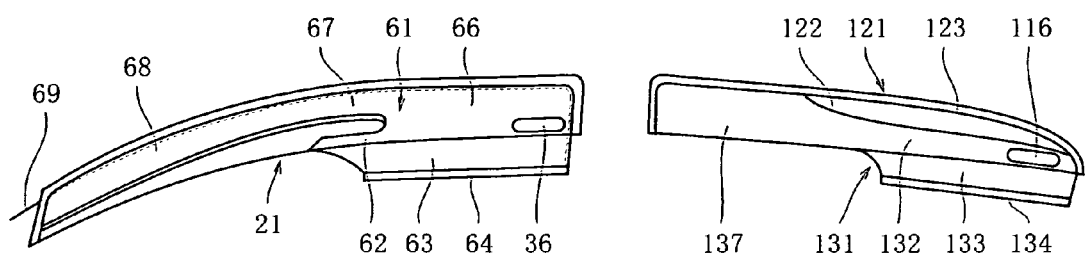
[Fig. 12]
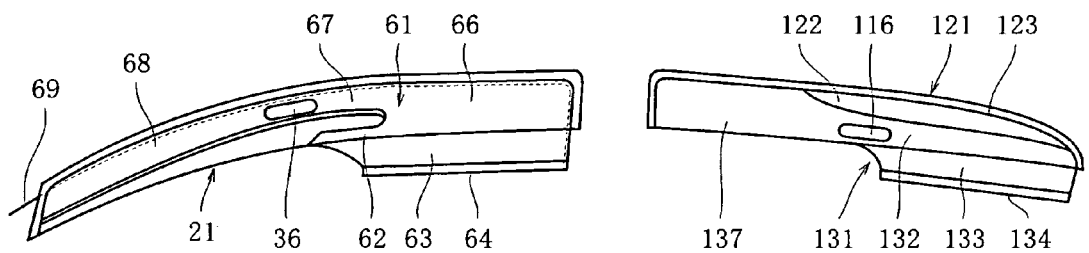
[Fig. 13]
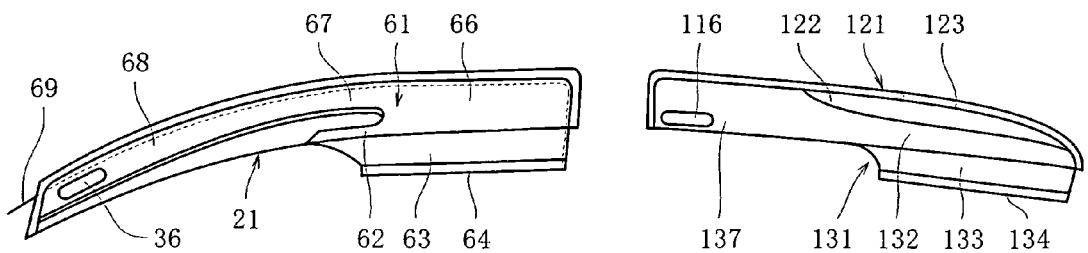

[Fig. 14]
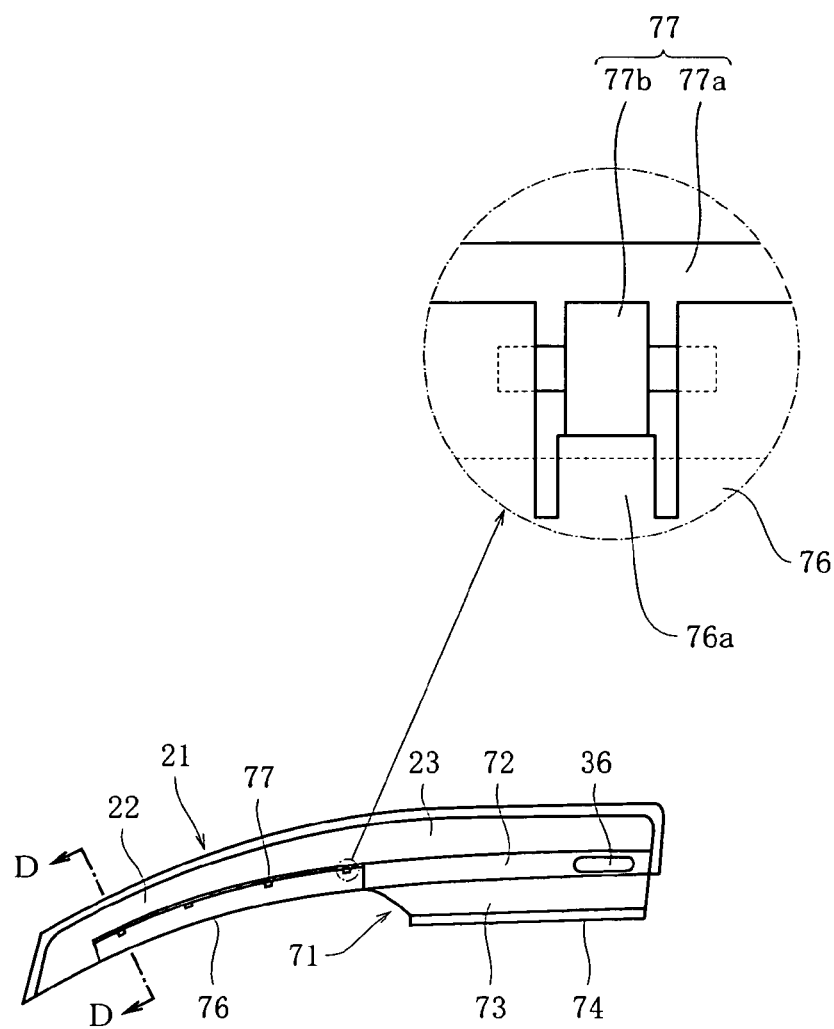

[Fig. 15]
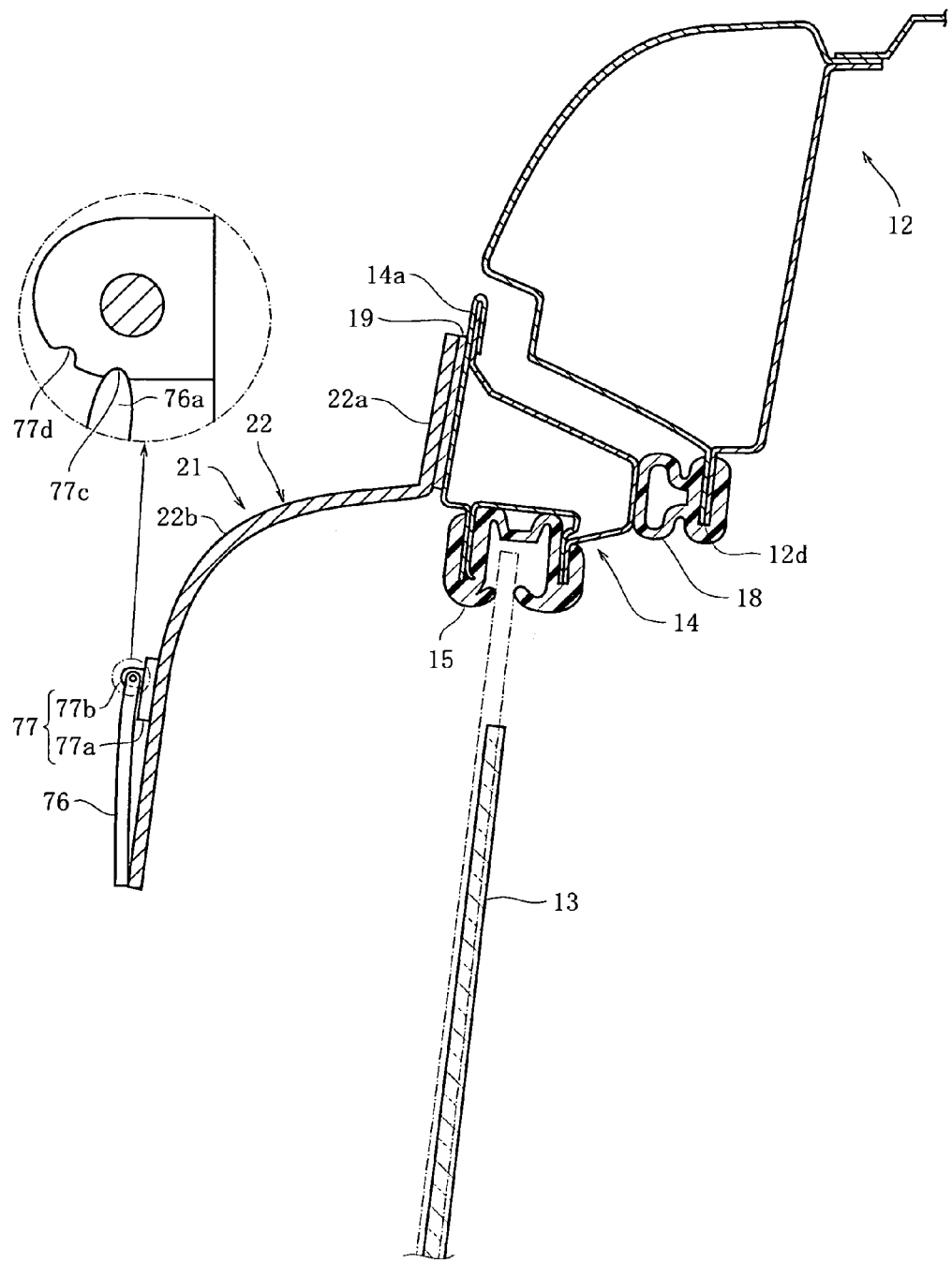

[Fig. 16]
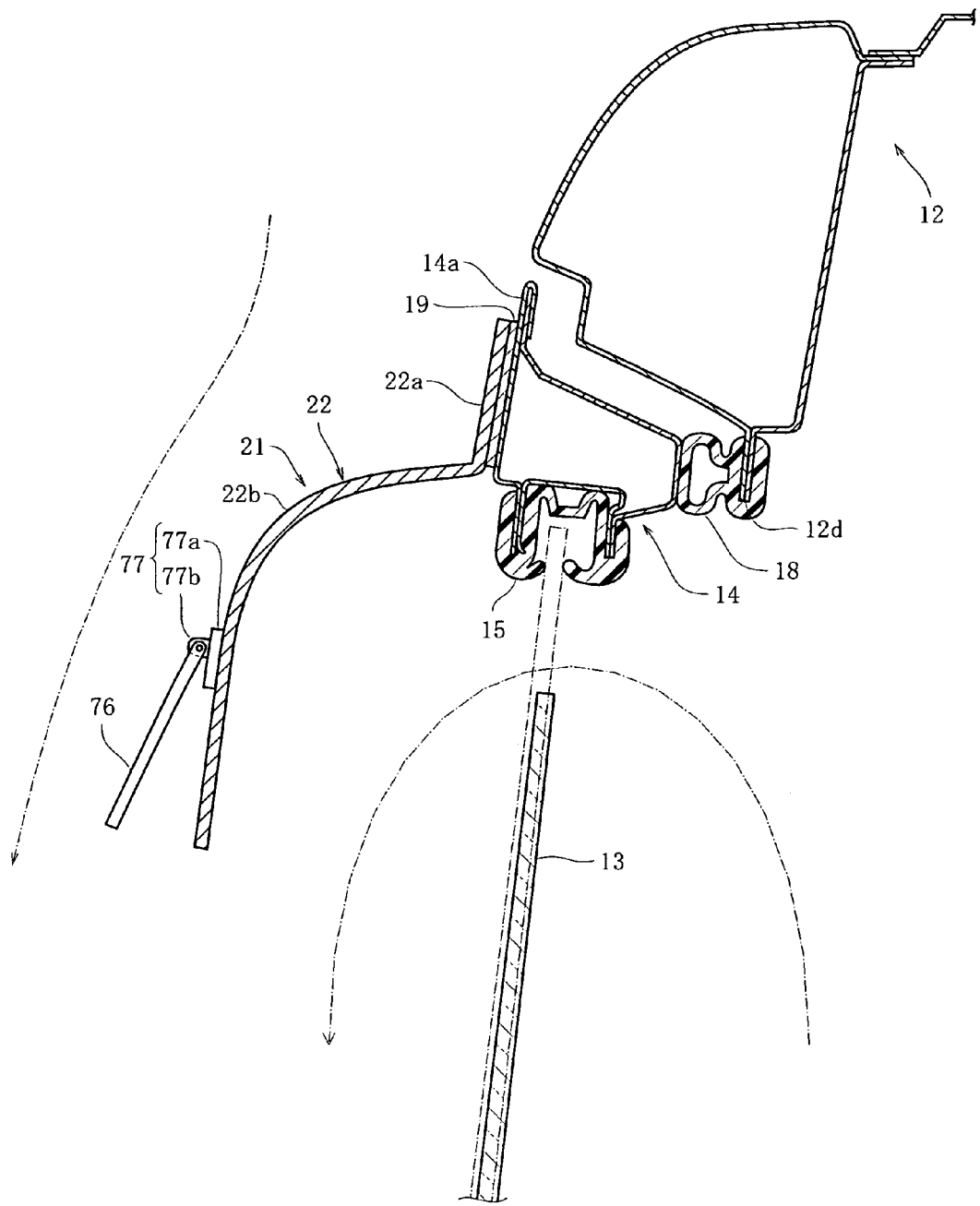

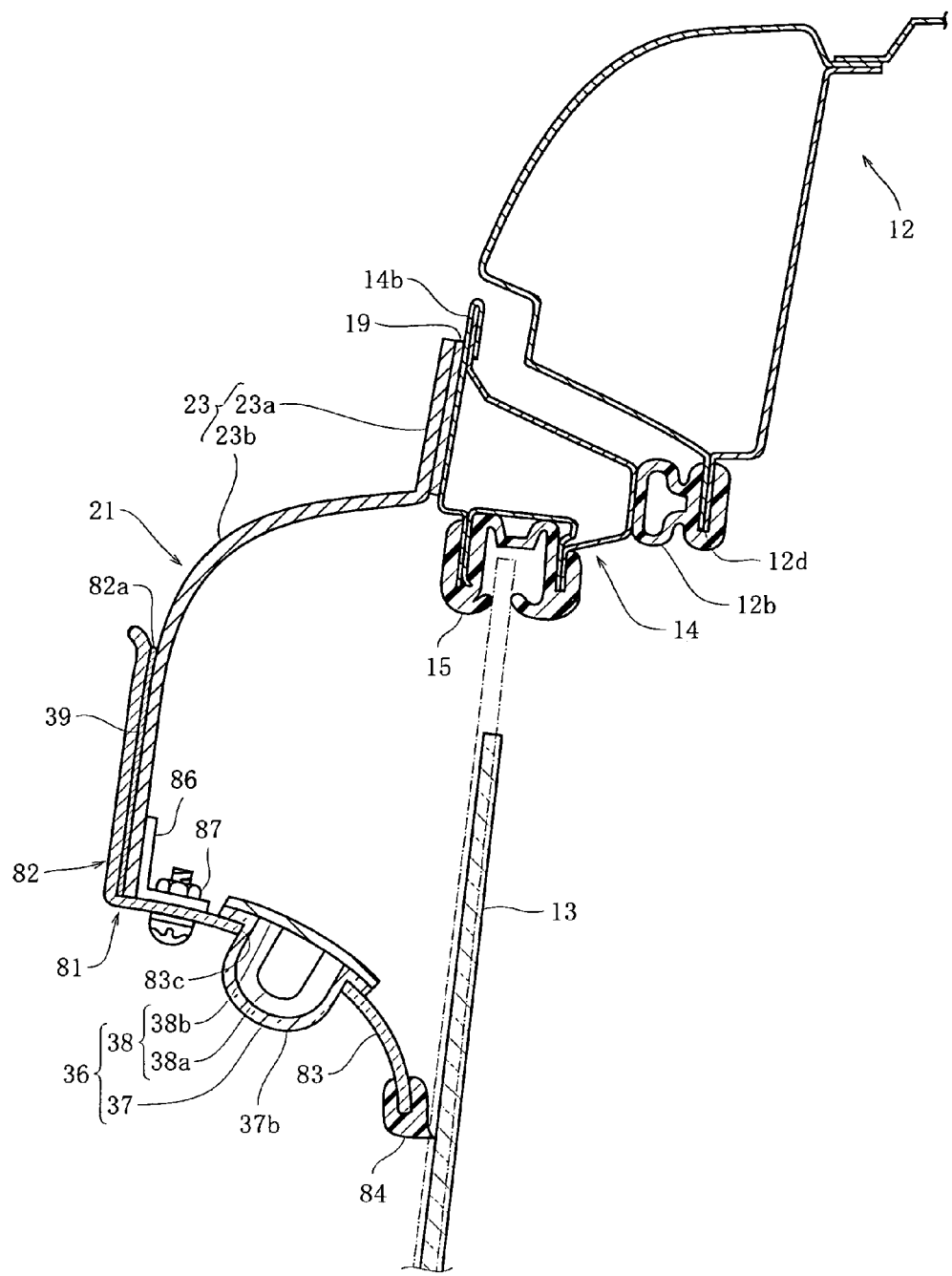
[Fig. 17]

[Fig. 18]
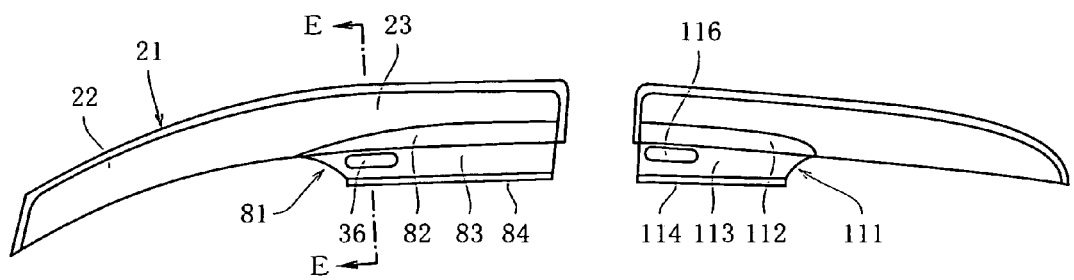
[Fig. 19]
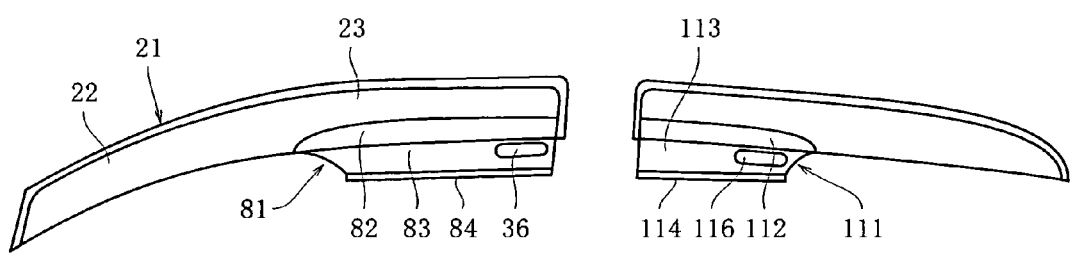
[Fig. 20]
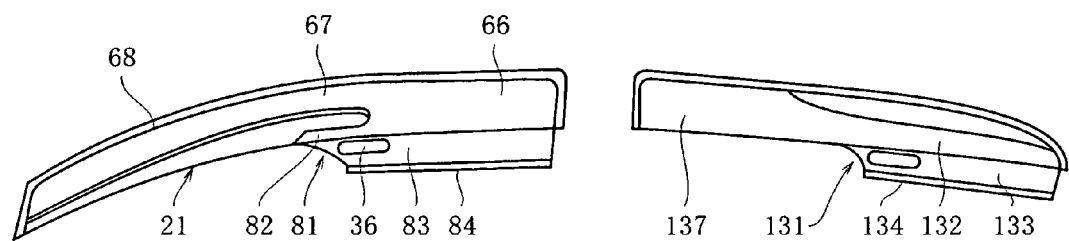
[Fig. 21]
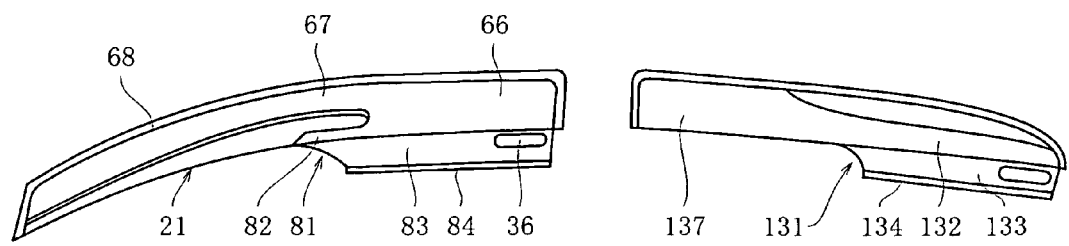

F I G. 25
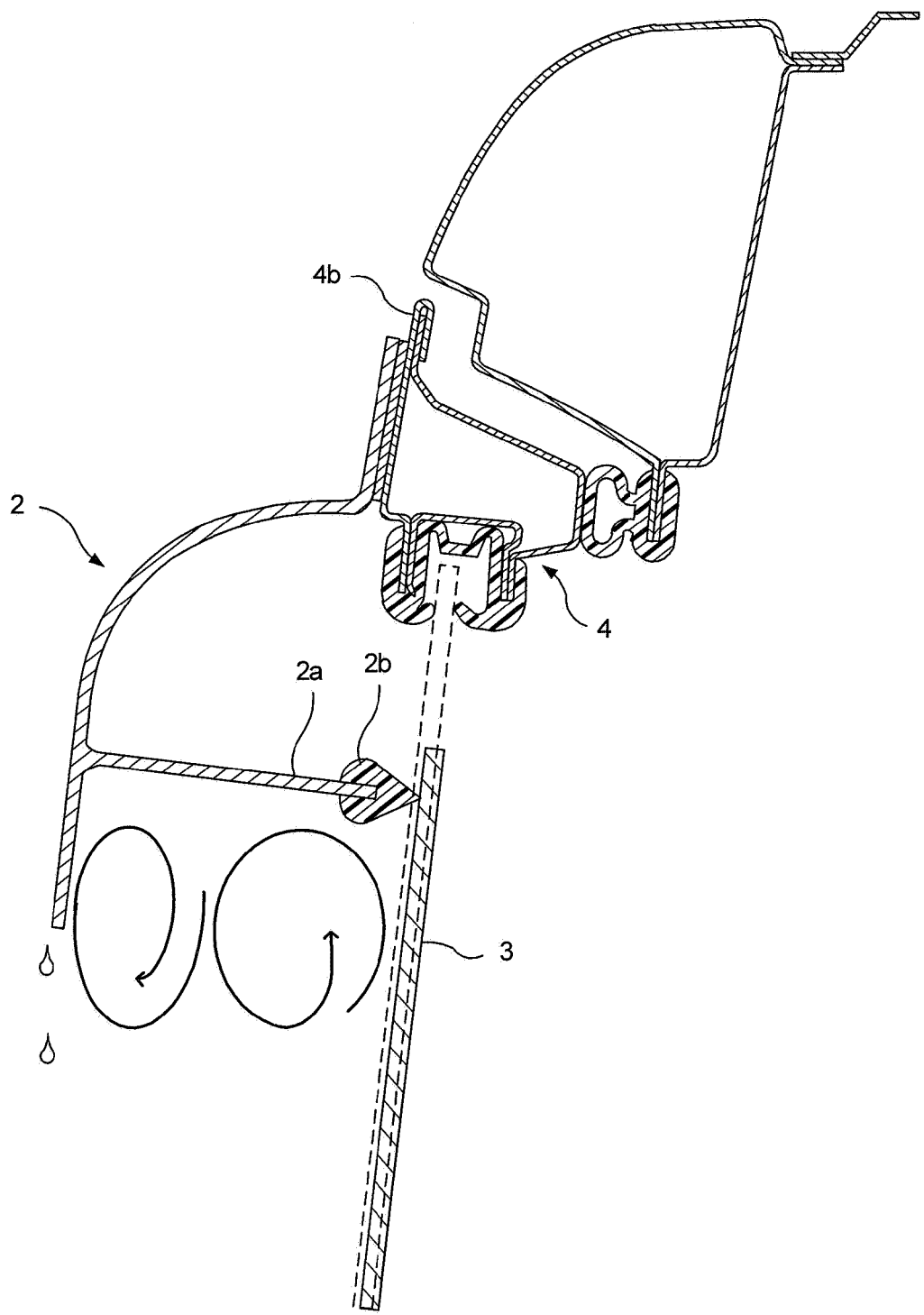
PRIOR ART

VEHICLE SIDE VISOR COVER

TECHNICAL FIELD

The present invention relates to a vehicle side visor cover attached on a side visor provided along a window frame of a vehicle door. More particularly, the present invention relates to a vehicle side visor cover which facilitates air ventilation in a car by slightly rolling down a window glass during traveling of a vehicle.

BACKGROUND ART

A vehicle side visor is conventionally formed into a window-roof shape which covers a front part and an upper part of a window glass covered with a window frame of a vehicle door, and an upper edge of this side visor is attached on the window frame. In a vehicle having such a side visor provided thereto, when the window glass is slightly rolled down during traveling, air flowing in the vicinity of the side visor forms a negative pressure, and air in a car is outwardly discharged from an opened gap, thereby ventilating the inside of the car. This side visor prevents rain drops from entering the car even if the side window glass is slightly rolled down for ventilation in the car even in the rain.

However, since an opening direction of the gap at the upper part of the door formed by slightly rolling down the side window glass is parallel to a flow of air outside the car, not only discharge of air by a negative pressure cannot be efficiently carried out from the upper part, but also air in the car discharged from a door front part flows upward through an outer part of the side window glass to again enter the car from the gap at the upper part in some cases. Further, in a state where the side window glass has been rolled up, a swirling current is generated between a rear end of the side visor and the side window glass, thereby increasing wind noise.

In order to eliminate these problems, as shown in FIG. 25, there has been proposed a side visor 2 having a configuration in which a protrusion piece 2a parallel to an upper edge of a side window glass 3 is provided at a part which covers a parallel upper part 4b of a window frame 4 of the side visor 2 from the outside of a vehicle and an elastic sealing material 2b is provided at an end of the protrusion piece 2a to come into contact with the side window glass 3 (see, e.g., Patent Reference 1). In such a side visor 2, even if air sucked from the inside of the car through a gap generated between a front part of the vehicle and the window glass 3 flows upward through an outer side of the window glass 3, the end of the protrusion piece 2a comes into contact with the side window glass 3 through the sealing material 2b to close the gap generated between the upper part 4b of the window frame 4 and the window glass 3, and hence an air current transmitted through the outer part of the window glass 3 can be prevented from again entering the car through this gap.

Patent Reference 1: Japanese Patent Application Laid-open No. 2003-312255 (claims)

DISCLOSURE OF THE INVENTION

Problems to be Solved by the Invention

However, when a user using a conventional side visor which does not have the protrusion piece 2a and the elastic sealing material 2b adopts the side visor 2 shown in FIG. 25, he/she must replace the entire vehicle side visor and discard the conventionally used side visor.

In order to eliminate this problem, additionally bonding the protrusion piece 2a to the conventionally used side visor can be considered. However, since a quantity of air sucked from the inside of the car is in proportion to the gap generated when the window glass 3 is rolled down, the gap generated between the front part of the vehicle and the window glass 3 through which air is actually sucked becomes very narrow when the protrusion piece 2a is attached on the side visor in parallel with the upper edge of the side window glass 3, thereby making it difficult to perform sufficient ventilation.

That is, even if the side window glass 3 is rolled down and opened at all portions covered with the vehicle side visor 2, the vehicle side visor 2 can prevent rain water dropping from the opened part from entering. However, in a case where the protrusion piece 2a is provided to the side visor in parallel with the upper edge of the side window glass 3, discharged air cannot be prevented from again entering when the side window glass 3 is rolled down beyond the protrusion piece 2a. Here, when the side window glass 3 is rolled down, a gap at a front inclined part from which air is actually discharged is narrower than the gap generated at the upper horizontal part. Therefore, when the protrusion piece 2a is provided above a lower end of the side visor 2, it is hard to assure a sufficient gap to actually discharge air at the front inclined part of the window frame 4, thereby making it difficult to perform sufficient ventilation.

Moreover, when the protrusion piece 2a is provided above the lower end of the side visor 2, there is a problem of occurrence of wind noise in a space sandwiched between the side window glass 3 and the side visor 2 below the protrusion piece 2a. That is, air discharged from the gap between the front inclined part of the window frame and the window glass 3 during traveling of a vehicle flows toward the rear side in the vicinity of the protrusion piece 2a while gyrating along the window glass 3, but a position at which a swirling current actually flows below the protrusion piece 2a is sandwiched between the side window glass 3 and the side visor 2, and hence a flow of the gyrating air current is obstructed as indicated by arrows in FIG. 25, thereby generating wind noise.

On the other hand, in a case where the protrusion piece 2a is continuously provided at the lower end of the side visor 2, the rain falling on the side visor is transmitted through the protrusion piece 2a from the lower end, and the rain water transmitted through the protrusion piece 2a falls into and enters a vehicle from an inner edge through the opened window frame in some cases when the side window glass is rolled down beyond the protrusion piece 2a.

It is an object of the present invention to provide a vehicle side visor cover which effectively utilizes a conventionally used side visor, prevents an air current transmitted through an outer part of a window glass from entering a car interior and enables sufficient ventilation in the car.

It is another object of the present invention to provide a vehicle side visor cover which allows an air current transmitted through an outer part of a window glass to rapidly flow, thereby suppressing occurrence of wind noise.

It is still another object of the present invention to provide a vehicle side visor cover which can effectively prevent the rain falling on a side visor from entering the inside of a car.

Means for Solving the Problems

As shown in FIGS. 1 and 8, the present invention according to claim 1 provides a vehicle side visor cover which is attached on a conventionally used vehicle side visor 21, 121 provided along a window frame 14, 18 of a vehicle door 11, 16 to effectively utilize the vehicle side visor 21, 121, the vehicle side visor cover comprising: a cover attachment portion 32, 112 which can be attached on an outer surface of the side visor 21, 121 and has a lower edge along a lower edge of the side visor 21, 121; a tabular sealing portion 33, 113 whose outer rim is integrally connected with the lower edge of the cover attachment portion 32, 112 and whose inner rim faces a rolled-up window glass 13, 17 of the door 11, 16; and an elastic material 34, 114 which is attached on the inner rim of the sealing portion 33, 113 and formed to come into contact with an outer surface of the rolled-up window glass 13, 17 of the door 11, 16.

The vehicle side visor cover described in claim 1 is attached on the vehicle side visors 21 and 121 provided along window frames 14 and 18 of vehicle doors 11 and 16, and hence the conventionally utilized side visors 21 and 121 can be effectively used.

Additionally, even though air sucked from the inside of the car through a gap generated between a front part 14a of the window frame 14 and the window glass 13 flows through an outer side of the window glass 13, the side visor cover 31 according to the present invention is attached on a horizontal part 23 of the side visor 21, and its sealing portion 33 covers a second visor main body 23b from a lower side, thereby effectively preventing an air current transmitted through the outer side of the window glass 13 from again entering the car through this gap. Further, since a cover attachment portion 32 is bonded to an outer surface of the side visor 21, appropriately selecting a bonding position of the cover attachment portion 32 in an up-and-down direction can adjust a vertical position of a sealing portion 33 which is formed by integrally connecting an outer rim thereof with a lower edge of the side visor. Therefore, an inner rim of the sealing portion 33 is placed at a position lower than that of the conventional protrusion piece 2a provided above the lower edge of the side visor 2, thereby largely rolling down the side window glass 13 as compared with the conventional product. Accordingly, since air is actually discharged to the front inclined part 14a of the window frame 14 from which air is actually discharged, a relatively large gap can be assured, thereby obtaining sufficient ventilation.

As shown in FIG. 23, the present invention according to claim 2 provides the vehicle side visor cover which is the invention defined in claim 1, wherein the sealing portion 33 comprises: a first sealing plate 33a whose outer rim is integrally connected with the lower edge of the cover attachment portion 32 and whose inner rim faces the rolled-up window glass 13 of the door 11; and a second sealing plate 33b which is superimposed and attached on the first sealing plate 33a so as to be movable in a car widthwise direction and has an inner rim on which the elastic material 34 is attached.

In the vehicle side visor cover described in claim 2, a width of the sealing portion 33 can be adjusted by moving the second sealing plate 33b in a vehicle widthwise direction in accordance with the gap between the side window glass 13 and a second visor main body 23b in the side visor 21, and matching the width of the sealing portion 33 with the gap between the side window glass 13 and the second visor main body 23b can assuredly close the gap. As a result, an air current transmitted through the outer side of the window glass 13 can be effectively prevented from entering the car.

As shown in FIG. 1, the present invention according to claim 3 provides the vehicle side visor which is the invention defined in claim 1, wherein the sealing portion 33 is formed in a curved in such a manner that it declines and approaches the window glass 13 as getting closer to the rolled-up window glass 13 of the door.

In the vehicle side visor cover described in claim 3, an inner rim of the sealing portion 33 is provided at a position lower than that of an outer rim thereof, and a rolling-down quantity of the window glass 13 can be increased in a state where an elastic body 34 is in contact with the side window glass 13, thereby assuring a relatively large gap for discharging air.

Furthermore, even though air discharged from the gap between the front inclined part 14a of the window frame 14 and the window glass 13 flows toward the rear side in the vicinity of the sealing portion 33 by gyrating along the window glass 13, since the sealing portion 33 is formed in a downward curve toward the window glass 13, a gyrating air current rapidly flows toward the rear side along the curved surface as indicated by an arrow in FIG. 1, thereby avoiding occurrence of wind noise due to obstructing a flow of the gyrating air current.

As shown in FIGS. 1 and 8, the present invention according to claim 4 provides the vehicle side visor cover which is the invention defined in claim 1, wherein the vehicles side visor 21 is provided along the window frame 14 of a front door 11, the side visor 21 of the front door 11 comprises: a first inclined portion 22 which covers an inclined front part 14a of the front window frame 14 from the outside of a vehicle; and a first horizontal portion 23 which is formed to be continuous with the first inclined portion 22 and covers a substantially horizontal upper part 14b of the front window frame 14 from the outside of the vehicle, and the cover attachment portion 32 can be attached on a lower outer surface of the first horizontal portion 23.

In the vehicle side visor cover described in claim 4, by slightly rolling down the window glass 13, air inside the car can be sucked from the gap between the inclined front part 14a of the front window frame 14 and the window glass 13. Additionally, the sealing portion continuously formed at the lower edge of the cover attachment portion 32 bonded on a lower outer surface of the first horizontal portion 23 prevents the sucked air from again entering the car from the gap between the upper part 14b of the front window frame 14a and the window glass 13.

As shown in FIG. 7, the present invention according to claim 5 provides the vehicle side visor which is the invention defined in claim 4, wherein an upper edge of the cover attachment portion 32 is formed to be smoothly continuous with a lower edge of the first inclined portion 22 of the vehicle side visor 21.

In the vehicle side visor cover described in claim 5, rain water which has fallen on the first horizontal portion 23 of the side visor 21 in rainy weather is guided to the lower edge of the first inclined portion 22 of the vehicle side visor 21 along the upper edge of the cover attachment portion 32 as indicated by arrows in FIG. 7. Therefore, the rain water fallen on the first horizontal portion 23 of the side visor 21 can be prevented from being transmitted through the sealing portion 33 beyond the cover attachment portion 32 and dropping into the car from the gap between the window glass 13 rolled below the side visor 21 and the window frame 14.

As shown in FIG. 8, the present invention according to claim 6 provides the vehicle side visor cover which is the invention defined in claim 4, wherein the vehicle side visor is provided along a window frame 18 of a rear door 16 in addition to the window frame 14 of the front door 11, the side visor 121 of the rear door 16 comprises: a second horizontal portion 122 which covers a substantially horizontal upper part 18*a* of the rear window frame 18 from the outside of the vehicle; and a second inclined portion 123 which is formed to be continuous with the second horizontal portion 122 and covers an inclined rear part 18*b* of the rear window frame 18 from the outside of the vehicle, and the cover attachment portion 112 can be attached on a lower outer surface of the second horizontal portion 122 or a lower outer surface of the second inclined portion 123.

In the vehicle side visor cover described in claim 6, the sealing portion 113 covers the lower part of the second horizontal portion 122 or the lower part of the second inclined portion 123 from the lower side to close the gap generated between the window frame 18 and a window glass 17. Therefore, air in the car sucked from the gap between the front part 14*a* of the window frame 14 and the rolled-down window glass 13 in the front door 11 flows toward the rear side of the vehicle 10 together with air outside the vehicle which flows by traveling of the vehicle, and hence the air can be prevented from again entering the car interior from the gap between the window frame 18 and the slightly-rolled-down window glass 17 in the rear door 16.

The present invention according to claim 7 provides the vehicle side visor cover which is the invention defined in claim 1, wherein a rain receiving groove 32*a* is formed at the upper edge of the cover attachment portion 32 alone (not shown) or together with the vehicle side visor 21 as shown in FIG. 1 over an entire length of the cover attachment portion 32.

In this vehicle side visor cover described in claim 7, rain water fallen on the first horizontal portion 23 of the side visor 21 in rainy weather can be assuredly received, and the rain water can be prevented from being transmitted through the sealing portion 33 beyond the cover attachment portion 32 and dropping into the car from the gap between the rolled-down window glass 13 and the window frame 14.

As shown in FIG. 1, the present invention according to claim 8 provides the vehicle side visor cover which is the invention defined in claim 1, wherein a lamp 36 is attached on the cover attachment portion 32 in such a manner that it can be visually recognized from the outside of the vehicle 10.

In this vehicle side visor cover according to claim 8, the lamp 36 can be readily attached on a side part of the vehicle 10 by a relatively easy operation, i.e., attachment on the side visor 21. Further, when this lamp 36 is electrically connected with a sidemarker lamp, the lamp 36 positioned on a outer side part of the vehicle is turned on during traveling at night, a driver of an oncoming vehicle or a third person walking along a road can recognize a size of the entire vehicle 10 in a widthwise direction and effectively avoid contact or the like with the vehicle 10, thereby achieving the sufficient safety.

On the other hand, when this lamp 36 is electrically connected with a direction indicator, a driver of a vehicle approaching to this vehicle from a lateral side thereof or a third person walking on the lateral side of the vehicle can easily recognize from the lamp 36 flashing at a relatively high position that a traveling direction of the vehicle 10 changes.

As shown in FIGS. 9 and 10, the present invention according to claim 9 provides the vehicle side visor which is the invention defined in claim 4, wherein a horizontal rear cover 66, a horizontal upper cover 67 and an inclined upper cover 68 are integrally formed with the cover attachment portion 62, the horizontal rear cover 66 being configured to be attached on a rear outer surface of the first horizontal portion 23 of the vehicle side visor 21, the horizontal upper cover 67 being configured to be attached on an upper outer surface of the first horizontal portion 23, the inclined upper cover 68 being configured to be attached on an upper outer surface of the first inclined portion 22 of the vehicle side visor 21, and a lamp 36 is attached on one of the cover attachment portion 62, the horizontal rear cover 66, the horizontal upper cover 67 and the inclined upper cover 68 in such a manner that it can be visually recognized from the outside of the vehicle 10.

In this vehicle side visor cover according to claim 9, a degree of freedom of an attachment position of the lamp 36 can be improved. Furthermore, when the cover attachment portion 62, the horizontal rear cover 66, the horizontal upper cover 67 and the inclined upper cover 68 are colored or plated in accordance with a color tone of the vehicle body, an aesthetic sense of the vehicle 10 can be improved.

As shown in FIG. 9, the present invention according to claim 10 provides the vehicle side visor cover which is the invention defined in claim 9, wherein a lead wire 69 which supplies power to the lamp 36 is arranged on one or both of inner surfaces of the horizontal upper cover 67 and the inclined upper cover 68.

In this vehicle side visor cover according to claim 10, since the lead wire 69 is covered with one or both of the horizontal upper cover 67 and the inclined upper cover 68, the lead wire 69 is prevented from appearing on the outer side of the vehicle 10, thereby improving the appearance of the vehicle 10.

As shown in FIG. 10, the present invention according to claim 11 provides the vehicle side visor which is the invention defined in claim 6, wherein a horizontal cover 137 which can be attached on an outer surface of the second horizontal portion 122 of the vehicle side visor 121 is integrally formed with the cover attachment portion 132, and a lamp 116 is attached on the cover attachment portion 132 or the horizontal cover 137 in such a manner that it can be visually recognized from the outside of the vehicle 10.

In this vehicle side visor cover according to claim 11, the lamp 116 can be attached to reach the outer part of the rear door 16. Further, when the cover attachment portion 132 and the horizontal cover 137 are colored or plated in accordance with a color tone of the vehicle body, an aesthetic sense of the vehicle 10 can be improved.

The prevent invention according to claim 12 provides the vehicle side visor cover which is the invention defined in claim 11, wherein a lead wire which supplies power to the lamp 116 is arranged on one or both of inner surfaces of the horizontal cover 137 or the cover attachment portion 132.

In this vehicles side visor cover according to claim 12, since the lead wire in the lamp 116 provided to the outer part of the rear door 16 is covered with one or both of the horizontal cover 137 and the cover attachment portion 132, the lead wire is prevented from appearing on the outer side of the vehicle 10, thereby improving the appearance of the vehicle 10.

As shown in FIG. 17, the present invention according to claim 13 provides the vehicle side visor cover which is the invention defined in claim 1, wherein a lamp 36 which illuminates a lower side is attached on the sealing portion 83.

In this vehicle side visor cover according to claim 13, when the lamp 36 is electrically connected with, e.g., an interior roof lamp, the lamp 36 illuminates a foothold of a driver or any other passenger who gets on and off the vehicle 10 so that the driver or any other passenger can safely get on and off the vehicle even in a place where sufficient illuminations are not provided.

As shown in FIG. 17, the present invention according to claim 14 provides the vehicle side visor cover which is the invention defined in claim 1, wherein a reinforcing holding piece 86 which is held at a lower end of the vehicle side visor 21 together with the cover attachment portion 82 is integrally provided at the lower edge of the cover attachment portion 82 or the sealing portion 83.

In this vehicle side visor cover according to claim 14, since the reinforcing holding piece 86 attached on the sealing portion 83 holds the lower end of the vehicle side visor 21 together with the cover attachment portion 82, attachment strength of the side visor cover 81 with respect to the vehicle side visor 21 can be improved.

As shown in FIG. 22, the present invention according to claim 15 provides the vehicle side visor cover which is the invention defined in claim 1, wherein the cover attachment portion 92 is attached at a lower end of the side visor 21 by being screwed to a clip 96 which allows fitting and has a U-shaped cross section.

In this vehicle side visor cover according to claim 15, the clip 96 which fits to the lower end of the side visor 21 can improve attachment strength of the side visor cover 91 with respect to the vehicle side visor 21.

As shown in FIGS. 14 to 16, the present invention according to claim 16 provides the vehicle side visor cover which is the invention defined in claim 4, wherein a flap 76 is continuously formed at a front end of the cover attachment portion 72 along a lower edge of the first inclined portion 22 of the vehicle side visor 21 on a lower outer surface of the first inclined portion 22, and the flap 76 can be selectively changed to one of a first position at which the entire flap 76 forms substantially the same plane as the first inclined portion 22 and a second position at which a lower end of the flap 76 increases a gap between itself and the first inclined portion 22.

In this vehicle side visor cover according to claim 16, when the flap is changed to the second position shown in FIG. 16, a gap between itself and the first inclined portion is increased. As a result, air in the vicinity of a first visor main body 22b is guided to the outside of the vehicle in a curve, and a negative pressure with respect to air in the vehicle is further increased as compared with a case where the flap 76 is not extended, whereby air in the car can be efficiently sucked from the gap between the front part 14a and the rolled-down window glass 13.

EFFECTS OF THE INVENTION

Since the vehicle side visor cover according to the present invention is attached to the vehicle side visor, the conventionally utilized side visor can be effectively used. Moreover, since the vehicle side visor cover comprises the cover attachment portion which can be attached to the outer surface of the side visor and has a lower edge parallel to a lower edge of the side visor, the plate-like sealing portion whose outer rim is integrally connected with the lower edge of the cover attachment portion and whose inner rim faces the rolled-up window glass of the door, and the elastic material which is attached to an inner rim of the sealing portion and formed to come into contact with the outer surface of the rolled-up window glass, and hence the sealing portion covers the side visor from the lower side, thereby effectively preventing an air current transmitted through the outer side of the window glass from again entering the vehicle via this gap. Additionally, since the cover attachment portion is bonded to the outer surface of the side visor, a vertical position of the sealing portion whose outer rim is integrally connected with the lowered edge of the cover attachment portion can be adjusted by appropriately selecting a bonding position of the cover attachment portion in the vertical direction, and a rolling-down quantity of the side window glass can be increased as compared with the prior art, thereby obtaining sufficient ventilation.

In this example, when the sealing portion comprises a first sealing plate whose outer rim is integrally connected with the lower edge of the cover attachment portion and whose inner rim faces the rolled-up window glass, and a second sealing plate which is attached to the first sealing plate to be superimposed on the first sealing plate movably in a vehicle widthwise direction and has an elastic material attached to the inner rim thereof, a width of the sealing portion can be adjusted by moving the second sealing plate in the vehicle widthwise direction in accordance with a gap between the side window glass and the side visor. Therefore, matching the width of the sealing portion with this gap can assuredly close this gap, and effectively prevent an air current transmitted through the outer side of the window glass from entering the vehicle.

On the other hand, when the sealing portion is formed in a curve so that it lowers and approaches the window glass as it gets closer to the rolled-up window glass of the door, a position of the inner rim of the sealing portion is lower than that of the outer rim, and a rolling-down quantity of the window glass can be increased in a state where the elastic body is in contact with the side window glass, thereby assuring a relatively wide gap through which air is discharged. Further, even though air discharged from the gap between the front inclined part of the window frame and the window glass flows toward the rear side in the vicinity of the sealing portion while gyrating along the window glass, since the sealing portion is formed in a curve in such a manner that it lowers as it gets closer to the window glass, the gyrating air current rapidly flows toward the rear side along the curved surface, thus avoiding occurrence of wind nose due to obstruction of a flow of the gyrating air current.

Furthermore, when the lamp is attached so that it is visible from the outside of the vehicle, the lamp can be readily attached on each of the side portions of the vehicle by a relatively easy operation, i.e., just attaching the vehicle side visor cover according to the present invention to the side visor. Moreover, when this lamp is electrically connected with the sidemarker lamp, the lamp positioned at each outer side portion of the vehicle is turned on during traveling at night, and a driver of an oncoming car or a third person walking along a road can recognize a size of the entire vehicle in a widthwise direction, thereby achieving sufficient safety while effectively avoiding contact or the like with this vehicle. On the other hand, when this lamp is electrically connected with each direction indicator, it is possible to recognize from the lamp blinking at a relatively high position that the vehicle is going to change a traveling direction. Moreover, when a lamp which illuminates a lower part is attached to the sealing portion and this lamp is electrically connected with a interior roof lamp, the lamp illuminates a foothold of a driver or any other passenger who gets on and off the vehicle, and the driver or any other passenger can safely get on and off the vehicle even in a place where illuminations are not enough.

BEST MODE FOR CARRYING OUT THE INVENTION

A best mode for carrying out the present invention will now be described with reference to the accompanying drawings.

As shown in FIG. 8, a front door 11 and a rear door 16 are provided on each side of a vehicle 10, and each door closes and opens a door opening portion 12d formed on a body 12. Window opening portions 11a and 16a are respectively formed at upper portions of the front door 11 and the rear door 16, and side window glasses 13 and 17 are attached to these window opening portions 11a and 16a. The window opening portions 11a and 16a are respectively formed of window frames 14 and 18, and window glass elevating devices are included in lower portions of the front door 11 and the rear door 16 although not shown. The non-illustrated window glass elevating devices close the window opening portions 11a and 16a with the respective window glasses 13 and 17 by upwardly moving the window glasses 13 and 17, and open the respective window opening portions 11a and 16a by downwardly moving the window glasses 13 and 17 to be accommodated in lower portions of the front door 11 and the rear door 16. Here, reference character 12a represents a side view mirror provided to the front door 11.

The front door 11 and the rear door 16 have substantially the same cross-sectional configurations and, giving a description on the front door 11 on behalf of both the doors, as shown in FIGS. 1 and 3, a window weather strip 15 to which an end of the rolled-up window glass 13 indicated by an alternating long and short dash line enters is attached on an inner periphery of the window frame 14, and an opening portion weather strip 12b is attached on the entire periphery of the door opening portion 12d. This opening portion weather strip 12b seals the car interior when an end portion of this strip comes into contact with the front door 11 in a state where the front door 11 is closed. Again referring to FIG. 8, a vehicle side visor 21 for the front door is attached to the window frame 14 of the front door 11, and a vehicle side visor 121 for the rear door is attached to the window frame 18 of the rear door 16. The side visor cover according to the present invention is attached to these side visors 21 and 121.

A description will be first given as to members which are attached to the front door 11. As shown in FIG. 8, the window frame 14 of the front door 11 has an inclined front part 14a and a horizontal upper part 14b, and a first inclined portion 22 which covers the front part 14a of the window frame 14 from the outside of the vehicle and a first horizontal portion 23 which covers the upper part 14b of the window frame 14 from the outside of the vehicle are integrally formed in the vehicle side visor 21 attached to this window frame 14. As shown in FIG. 3, the first inclined portion 22 comprises a first flange portion 22a attached to the front part 14a and a first visor main body 22b continuously formed at a lower end of this first flange portion 22a. This first visor main body 22b is integrally formed with the first flange portion 22a in such a manner that it is outwardly curved and downwardly extended from the front part 14a of the window frame 14 and a predetermined gap is provided between a lower end thereof and an outer surface of the rolled-up window glass 13.

On the other hand, as shown in FIG. 1, the first horizontal portion 23 has a second flange portion 23a attached to the upper part 14b and a second visor main body 23b continuously formed at a lower end of this flange portion 23a. This second visor main body 23b is integrally formed with the second flange portion 23a and formed to outwardly curve and downwardly extend from the upper part 14b of the window frame 14, and a rear end portion of the second visor main body 23b is closed. As shown in FIGS. 1 and 3, the first flange portion 22a and the second flange portion 23a are formed in accordance with the front part 14a and the upper part 14b, and the side visor 21 is attached to the window frame 14 by bonding these first and second flange portions 22a and 23a to the front part 14a and the upper part 14b of the window frame 14 through a double-faced adhesive tape 19.

<First Embodiment>

FIGS. 1, 4 and 8 show a vehicle side visor cover 31 in a first embodiment. This vehicle side visor cover 31 is attached to the vehicle side visor 21 provided along the window frame of the vehicle front door 11, and comprises a cover attachment portion 32 which can be attached on an outer surface of the side visor 21 and has a lower end parallel with a lower end of the side visor 21, a tabular sealing portion 33 whose outer rim is integrally connected with the lower end of the cover attachment portion 32 and whose inner rim faces the rolled-up window glass 13 of the front door 11, and an elastic material 34 which is attached at the inner rim of the sealing portion 33 and formed to come into contact with the outer surface of the rolled-up window glass 13.

The cover attachment portion 32 and the sealing portion 33 are integrally formed by molding a non-color or color transparent resin. In this embodiment, since the side visor 21 includes the first inclined portion 22 and the first horizontal portion 23, the cover attachment portion 32 of the side visor cover 31 attached to this side visor 21 can be attached on a lower outer surface of the first horizontal portion 23 of the side visor 21. Furthermore, as shown in FIG. 4, the upper edge of the cover attachment portion 32 is formed to describe a gentle curve so that it is gently and continuously connected with the lower edge of the first inclined portion 22 of the vehicle side visor 21. On the other hand, as shown in FIG. 1, at the upper edge of the cover attachment portion 32, a rain receiving groove 32a is formed by this attachment portion 32 alone or together with the vehicle side visor 21 over the entire length of the cover attachment portion 32.

Moreover, a lamp 36 is attached to the cover attachment portion 32 so that the lamp 36 can be seen from the outside of the vehicle 10. As shown in FIGS. 1 and 2, the lamp 36 in this embodiment has a translucent lamp cover 37 attached in a through hole 32c formed at a rear part of the cover attachment portion 32 and a lamp body 38 which is covered with the lamp cover 37 and detachably attached to the lamp cover 37. The through hole 32c shown in the drawing is formed into a horizontally long shape extending in a front-and-back direction of the vehicle 10, and the lamp cover 37 is formed by molding a translucent resin. The lamp cover 37 has a curved portion 37b which is formed in a curve so as to bulge from the surface of the cover attachment portion 32 in a state where it covers the lamp body 38 from the front surface and is inserted in the through hole 32c, and a flange portion 37c which is continuously formed around the entire periphery of the curved portion 37b and faces the cover attachment portion 32 at a hole edge of the through hole 32c. The lamp cover 37 comprising the curved portion 37b and the flange portion 37c is elongated in accordance with the horizontally long through hole 32c.

On the other hand, as the lamp body 38 shown in FIGS. 1 and 2, there is used one having a plurality of LEDs (light emitting diodes) 38a linearly arranged on a substrate 38b. The periphery of the substrate 38b and the periphery of the lamp cover 37 are bonded to each other to constitute the lamp body 38, and the lamp body 38 is attached to the cover attachment portion 32 by bonding the flange portion 37*c* of the lamp cover 37 to the periphery of the through hole 32*c*. It is to be noted that, although not shown, a metal foil is attached to the periphery of the through hole 32*c* of the cover attachment portion 32 so as to surround the through hole 32*c* from the front side, and the appearance of the periphery of the lamp body 38 can be improved by covering the substrate 38*b* and others on the rear side of the cover attachment portion 32 around the through hole 32*c* from the front side.

As shown in FIG. 1, the cover attachment portion 32 is bonded and attached on the lower outer surface of the first horizontal portion 23 of the side visor 21 through the double-faced adhesive tape 39. The sealing portion 33 whose outer rim is integrally connected and formed to the lower edge of this cover attachment portion 32 is formed in a curve in such a manner that it extends downwardly and approaches the window glass 13 as it gets close to the rolled-up window glass 13 of the door 11. The elastic body 34 attached at the inner rim of this sealing portion 33 is formed of, e.g., synthetic rubber so that it can come into contact with the outer surface of the rolled-up window glass 13 as indicated by an alternate long and short dash line in FIG. 1. This sealing portion 33 reduces vibration noise during traveling of the vehicle when it comes into contact with the outer surface of the window glass 13 through this elastic body 34, and prevents an unwanted spray of water or the like from entering from a gap between the side visor 21 and the window glass 13.

In the thus configured vehicle side visor cover 31, air outside the vehicle 10 flows toward the rear side of the vehicle 10 when the vehicle 10 travels. When a driver of the vehicle 10 slightly rolls down the side window glass 13 in order to ventilate the inside of the car, air in the vicinity of the first visor main body 22*b* in the first inclined portion 22 of the side visor 21 forms a negative pressure with respect to air in the car, and air in the car is efficiently sucked from the gap between the front part 14*a* and the rolled-down window glass 13. The air in the car sucked from this gap flows toward the rear side of the vehicle 10 together with air outside the vehicle which flows during traveling of the vehicle. Additionally, although the air sucked from the inside of the car through the gap generated between the front part 14*a* and the window glass 13 flows upwardly through the outer side of the window glass 13, the side visor cover 31 according to the present invention is attached to the horizontal portion 23 of the side visor 21, the sealing portion 33 covers the second visor main body 23*b* from the lower side, and the elastic body 34 attached at the inner rim of the sealing portion 33 comes into contact with the window glass 13 to close the gap produced between the upper part 14*b* of the window frame and the window glass 13. Therefore, it is possible to effectively prevent an air current transmitted through the outer side of the window glass 13 from again entering the car through this gap while effectively utilizing the side visor 21 already attached to the door 11.

Further, in the side visor cover 31 according to the present invention, since the cover attachment portion 32 is bonded on the outer surface of the side visor 21, it is possible to adjust a vertical position of the sealing portion 33 whose outer rim is integrally connected and formed to the lower edge of the cover attachment portion 32 by shifting up and down a bonding position of the cover attachment portion 32. Therefore, as compared with the conventional protrusion piece 2*a* provided above the lower edge of the side visor 2 shown in FIG. 25, the inner rim of the sealing portion 33 is placed at a lower position, and the side window glass 13 can be sufficiently rolled down as compared with the prior art. Therefore, in order to actually discharge air, a relatively wide gap can be assured at the front inclined part 14*a* of the window frame 14 from which air is actually discharged, thereby obtaining sufficient ventilation.

In this embodiment in particular, since the sealing portion 33 is formed in a curve in such a manner that it extends downwardly and approaches the window glass 13 as it gets closer to the rolled-up window glass 13 of the door, the inner rim of the sealing portion 33 is placed at a lower position than the outer rim, it is possible to increase a quantity of rolling down the window glass 13 in a state where the elastic body 34 is in contact with the side window glass 13, and a relatively wide gap from which air is discharged can be assured. Furthermore, although air discharged from the gap between the front inclined portion 14*a* of the window frame 14 and the window glass 13 flows toward the rear side in the vicinity of the sealing portion 33 while gyrating along the window glass 13, the sealing portion 33 is formed in a curve in such a manner that it extends downwardly as it gets close to the window glass 13, and hence a gyrating air current rapidly flows toward the rear side along the curved surface, thereby avoiding occurrence of wind noise due to obstructing a flow of the gyrating air current.

On the other hand, since the upper edge of the cover attachment portion 32 in the vehicle side visor cover 31 is formed so as to be smoothly continuous with the lower edge of the first inclined portion 22 of the vehicle side visor 21, the rain water fallen on the first horizontal portion 23 of the side visor 21 in the rainy weather is guided to the lower edge of the first inclined portion 22 of the vehicle side visor cover 21 along the upper edge of the cover attachment portion 32, and flows along the lower edge of the first inclined portion 22. Therefore, it is possible to prevent the rainwater fallen on the first horizontal portion 23 of the side visor 21 from being transmitted through the sealing portion 33 beyond the cover attachment portion 32 and the rain water from dropping in the car from the gap between the rolled-down window glass 13 and the window frame 14. Moreover, since the rain receiving groove 32*a* is formed at the upper edge of the cover attachment portion 32 over the entire length of the cover attachment portion 32, the rain water can be effectively prevented from dropping in the car from the gap between the rolled-down window glass 13 and the window frame 14.

It is to be noted that although the description has been given as to the example where the lamp 36 is attached at the rear part of the cover attachment portion 32 in the first embodiment, the lamp 36 does not have to be necessarily attached, and the lamp 36 may be attached at a central portion of the cover attachment portion 32 as shown in FIG. 5 or may be attached at a front portion of the cover attachment portion 32 as shown in FIG. 6 in case of attaching the lamp 36.

Additionally, although the description has been given as to the example where the cover attachment portion 32 is bonded and attached on the lower outer surface of the first horizontal portion 23 of the side visor 21 through the double-faced adhesive tape 39 in the foregoing embodiment, the cover attachment portion 32 may be bonded and attached to the side visor 21 through an adhesive, or the cover attachment portion 32 may be attached on the lower outer surface of the side visor 21 by using screwing means. Further, the cover attachment portion 32 may be attached on the lower outer surface of the side visor 21 by welding, or it may be attached on the lower outer surface of the side visor 21 by using a special metal fitting for attachment.

<Second Embodiment>

FIGS. 9 to 11 show a second embodiment according to the present invention. In the drawings, like reference numerals denote components equal to those in the foregoing embodiment, thereby eliminating the tautological explanation.

In a vehicle side visor cover 61 in this second embodiment, to a cover attachment portion 62 are integrally formed a horizontal rear cover 66 configured to be attached on a rear outer surface of a first horizontal portion 23 of a vehicle side visor 21, a horizontal upper cover 67 configured to be attached on an upper outer surface of the first horizontal portion 23, and an inclined upper cover 68 configured to be attached on an upper outer surface of a first inclined portion 22 of the vehicle side visor 21. An outer rim of a sealing portion 63 is integrally connected and formed to a lower edge of the cover attachment portion 62 and an inner rim of the same faces a rolled-up window glass 13 of the door 11. Further, an elastic material 64 formed to come into contact with an outer surface of the rolled-up window glass 13 of the door 11 is attached at the inner rim of the sealing portion 63.

A lamp 36 is attached on the horizontal rear cover 66 in such a manner that the lamp 36 can be visually recognized from the outside of a vehicle 10. The lamp 36 attached in this example is the same as the lamp 36 in the foregoing embodiment, thereby eliminating the tautological explanation. A lead wire 69 which supplies power to this lamp 36 is arranged to both the horizontal upper cover 67 and the inclined upper cover 68.

Giving a concrete description, one end of the coated lead wire 69 is electrically connected with a plurality of LEDs 38a of this lamp 36. On the other hand, a concave groove 67a (FIG. 9 shows a concave portion formed on the horizontal upper cover only) which is continuous in the longitudinal direction to face the side visor 21 is formed on the horizontal upper cover 67 and the inclined upper cover 68 of the vehicle side visor cover 61, and this coated lead wire 69 is arranged in this concave grove 67a. The other end of the lead wire 69 whose one end is electrically connected to the lamp 36 and which is arranged in the concave groove 67a is configured to protrude from a front end of the inclined upper cover 68 as shown in FIG. 11. As shown in FIG. 9, a double-faced adhesive tape 39 is attached on the horizontal upper cover 67 and the inclined upper cover 68 having the coated lead wire 69 arranged in the concave groove 67a, and this double-faced adhesive tape 39 is also attached on the horizontal rear cover 66 and the cover attachment portion 62. Furthermore, the side visor cover 61 is respectively bonded on the outer surfaces of the first inclined portion 22 and the first horizontal portion 23 of the side visor 21 through this double-faced adhesive tape 39.

In a state where the side visor cover 61 including the lamp 36 is attached to the side visor 21, since the coated lead wire 69 is covered with the horizontal upper cover 67 and the inclined upper cover 68, and hence the lead wire 69 does not appear on the outside of the vehicle 10, thereby improving the appearance of the vehicle 10. In this embodiment, the other end of the coated lead wire 69 is electrically connected with a sidemarker lamp of the vehicle 10. That is, the other end of the coated lead wire 69 is arranged in a door mirror 12a from a part where the door mirror 12a is attached, further arranged in the vehicle 10 together with a wiring harness which drives a non-illustrated electric motor in the door mirror 12a, and connected with the lead wire which supplies power to the sidemarker lamp of the vehicle 10. As a result, the power is supplied to turn on the sidemarker lamp and, at the same time, the power is also supplied to a lamp body 38 through the coated lead wire 69 so that the LEDs 38a of the lamp body 38 are turned on.

In the vehicle 10 in which the coated lead wire 69 is arranged and the vehicle side visor cover 61 is attached to the side visor 21, like the foregoing embodiment, the side visor 21 can be effectively utilized, and an air current transmitted through the outer side of the window glass 13 can be prevented from entering the car while enabling sufficient ventilation.

Furthermore, when a driver turns on a head lamp as well as the sidemarker lamp during traveling of the vehicle 10 at night, the lamp 36 electrically connected with the sidemarker lamp is turned on. Since this lamp 36 has a lamp cover 37, a driver of an oncoming vehicle or a third person walking along a road can recognize a size of the entire vehicle 10 in a widthwise direction by lighting of the lamp 36 when this lamp 36 is turned on, whereby contact or the like with the vehicle 10 can be effectively avoided, thereby achieving sufficient safety.

It is to be noted that the description has been given as to the example where the lamp 36 is attached on the horizontal rear cover 66 in the foregoing embodiment, but the lamp 36 may be attached on the cover attachment portion 62. Moreover, this lamp 36 may be attached on the horizontal upper cover 67 as shown in FIG. 12, and this lamp 36 may be attached on the inclined upper cover 68 as shown in FIG. 13. Here, when the lamp 36 is attached on the inclined upper cover 68, the lead wire 69 which supplies the power to this lamp 36 is arranged in the inclined upper cover 68.

<Third Embodiment>

FIGS. 14 to 16 show a third embodiment according to the present invention. In the drawings, like reference numerals denote components equal to those in the foregoing embodiments, thereby avoiding a tautological explanation.

A vehicle side visor cover 71 in the third embodiment is formed in such a manner that a flap 76 is continuously formed with a front end of a cover attachment portion 72 on a lower outer surface of a first inclined portion 22 of a vehicle side visor 21. The cover attachment portion 72 can be attached on a lower outer surface of a first horizontal portion 23 of the side visor 21, and an outer rim of a sealing portion 73 is integrally connected with a lower edge of the cover attachment portion 72. An inner rim of the sealing portion 73 faces a rolled-up window glass 13 of the door 11, and an elastic material 74 formed to come into contact with an outer surface of the window glass 13 is provided at the inner rim of the sealing portion 73.

The flap 76 continuously formed with the cover attachment portion 72 is attached to be parallel with the lower edge of the first inclined portion 22 through an attachment member 77. Giving a specific description, the attachment member 77 has a substrate 77a which is continuously formed at a front end of the cover attachment portion 72 and bonded on the first inclined portion 22 of the side visor 21, and a pivot piece 77b which protrudes on this substrate 77a and whose end has a semicircular outer shape, and a front end of this flap 76 is pivoted by this pivot piece 77b. On an outer periphery of the semicircular end of the pivot piece 77b are formed a first concave portion 77c corresponding to a first position at which the flap 76 forms substantially the same plane as the first inclined portion 22 as shown in FIG. 15 and a second concave portion 77d corresponding to a second position at which a gap between the flap 76 and the first inclined portion 22 is increased as shown in FIG. 16. A locking piece 76a which locks in the first concave portion 77c at the first position of the flap 76 and locks in the second concave portion 77d at the second position of the flap 76 is formed with respect to the flap 76, and this flap 76 can be selectively changed to one of the first position and the second position when this locking piece 76a selectively locks in one of the first and second concave portions 77c and 77d.

In the thus configured vehicle side visor cover 71, when a driver of the vehicle 10 slightly rolls down the side window glass 13 in order to ventilate the inside of the car, air in the vicinity of a first visor main body 22b at the first inclined portion 22 of the side visor 21 forms a negative pressure with respect to air in the car, and the air in the car is sucked from a gap between the front part 14a and the rolled-down window glass 13 and flows to the rear side of the vehicle 10 together with the air outside the vehicle. Since a quantity of the sucked air is in proportion to the gap between the first inclined portion 22 of the side visor 21 and the side window glass 13, the flap 76 is changed to the first position shown in FIG. 15 if this gap is sufficient. On the other hand, in case of the side visor in which this gap is relatively small, since sufficient ventilation cannot be expected when the flap is placed at the first position, this flap is changed to the second position shown in FIG. 16 to increase the gap between the first inclined portion and the side window glass. As a result, air in the vicinity of the first visor main body 22b is guided to the outer side of the vehicle in a curve and further forms a negative pressure with respect to air in the car, and hence the air in the car can be sufficiently sucked from the gap between the front part 14a and the rolled-down window glass 13. Therefore, attaching the side visor cover 71 according to the present invention on the side visor 21 in which the gap between the first inclined portion 22 and the window glass 13 is relative small can assure sufficient ventilation.

<Fourth Embodiment>

FIGS. 17 and 18 show a fourth embodiment according to the present invention. In the drawings, like reference numerals denote components equal to those in the foregoing embodiments, thereby eliminating a tautological description.

In a vehicle side visor cover 81 according to this embodiment, a reinforcing holding piece 86 which is held at a lower end of a vehicle side visor 21 together with a cover attachment portion 82 is integrally provided with a sealing portion 83. The reinforcing holding piece 86 in this embodiment is formed by bending a steel plate into an L-like shape, and attached on the sealing portion 83 by screwing means 87 so as to be movable in a car widthwise direction. The cover attachment portion 82 is bonded on an outer surface of the side visor 21 by a double-faced adhesive tape 39, and has a lower edge which is in parallel with a lower edge of the side visor 21. The sealing portion 83 is formed in such a manner that an outer rim thereof is integrally connected with the lower edge of the cover attachment portion 82 and an inner rim thereof faces a rolled-up window glass 13 of a door 11. The reinforcing holding piece 86 attached on the sealing portion 83 holds the lower end of the vehicle side visor 21 together with the cover attachment portion 82, thereby improving attachment strength of the side visor cover 81 with respect to the side visor 21.

An elastic material 84 formed to come into contact with an outer surface of the rolled-up window glass 13 of the door 11 is attached at an inner rim of the sealing portion 83, and a lamp 36 which illuminates a lower part is further attached on a front part of the sealing portion 83 through hole 83c. The lamp 36 attached in this example is the same as that used in the foregoing embodiments, thereby eliminating a repeated description thereof. A lead wire 69 which supplies power to this lamp 36 is arranged in both the cover attachment portion 82 and the sealing portion 83, and connected with an interior roof lamp of the vehicle 10.

In the vehicle 10 having the thus configured vehicle side visor cover 81 attached on the side visor 21, when a driver opens the door 11 in order to get on the vehicle 10 or get out of a driver's seat, the non-illustrated interior roof lamp is tuned on, and the lamp 36 which is electrically connected with the interior roof lamp and attached on the sealing portion 83 is turned on. Since the lamp 36 is attached on the sealing portion 83 to illuminate a lower part, it illuminates a foothold of a driver who has opened the door from the outside of the vehicle 10 or the outside of the vehicle that the driver is going to get out. When the lamp 36 is turned on in this manner, it is possible to assure safety of the driver who is going to get on the vehicle 10 or the foothold of the driver who is going to get out of the driver's seat. In this case, since the lamp 36 is attached on the sealing portion 83, the sealing portion 83 may possibly become loose, but the reinforcing holding piece 86 attached on the sealing portion 83 holds the lower end of the vehicle side visor 21 together with the cover attachment portion 82 to improve the attachment strength of the side visor cover 81, thereby effectively avoiding related looseness.

Although the description has been given as to the example where the reinforcing holding piece 86 is provided to the sealing portion 83 in the fourth embodiment, the reinforcing holding piece 86 may be provided to the cover attachment portion 82.

Additionally, although the description has been given as to the example where the lamp 36 is attached at the front part of the sealing portion 83 in the fourth embodiment, the lamp 36 may be attached at a rear part of the sealing portion 83 as shown in FIG. 19. Further, as shown in FIGS. 20 and 21, the vehicle side visor cover 81 may include the horizontal rear cover 66, the horizontal upper cover 67 and the inclined upper cover 68 and, in this case, the lamp 36 may be attached at the front part of the sealing portion 83 as shown in FIG. 20, and this lamp 36 may be attached at the rear part of the sealing portion 83 as shown in FIG. 21.

Furthermore, although the description has been given as to the example where the cover attachment portion 32, 62, 72 or 82 is bonded on the outer surface of the vehicle side visor 21 through the double-faced adhesive tape 39 in the first to fourth embodiments, the cover attachment portion 32, 62, 72 or 82 may be screwed on the outer surface of the vehicle side visor together with this adhesive. In this case, as shown in FIG. 22, when a clip 96 having a U-shaped cross section is fitted at the lower end of the side visor 21 and the a cover attachment portion 92 in a vehicle side visor cover 91 is screwed to this clip 96 by using screwing means 97, attachment strength of the side visor cover 91 with respect to the side visor 21 can be assuredly improved. A sealing portion 93 in FIG. 22 has a configuration in which an outer rim thereof is integrally connected with a lower edge of a cover attachment portion 92 but it once bulges toward the outside of the vehicle and an inner rim thereof faces a rolled-up window glass 13 of the door 11. Furthermore, an elastic material 94 formed to come into contact with an outer surface of the rolled-up window glass 13 is attached at an inner rim of the sealing portion 93.

Moreover, although the description has been given as to the example where the sealing portion 33, 63, 73 or 83 is formed in a curve so that it downwardly extends as it gets close to the rolled-up window glass 13 of the door 11 in the first to fourth embodiments, the sealing portion may have a tabular shape. In this case, as shown in FIG. 23, the sealing portion 33 may be constituted of a first sealing plate 33*a* and a second sealing plate 33*b*. The illustrated first sealing plate 33*a* is formed in such a manner that an outer rim thereof is integrally connected with the lower edge of the cover attachment portion 32 so that an inner rim thereof faces the rolled-up window glass 13 of the door 11, and a plurality of irregularities having triangular cross sections are formed on an upper surface of the first sealing plate 33*a* along a longitudinal direction. On the other hand, the second sealing plate 33*b* is superimposed on the first sealing plate 33*a* from an upper side, and irregularities which fit to the irregularities of the first sealing plate 33*a* are formed on a lower surface of the second sealing plate 33*b*. A through hole 33*d* into which a male screw 33*c* can be inserted is formed in the first sealing plate 33*a*, and a slit 33*e* into which the male screw 33*c* can be inserted and which is long in a car widthwise direction is formed in the second sealing plate 33*b* superimposed on the first sealing plate 33*a* at a part facing the through hole 33*d*. A female screw 33*f* is screwed with respect to the male screw 33*c* inserted through the through hole 33*d* and the slit 33*e*, and the second sealing plate 33*b* is attached on the first sealing plate 33*a* so as to be movable in the car widthwise direction by fastening this female screw 33*f*. Moreover, an elastic material 34 is attached at an inner rim of the second sealing plate 33*b*.

In case of such a sealing portion 33, a width of the sealing portion 33 can be adjusted by moving the second sealing plate 33*b* in the car widthwise direction in accordance with a gap between the side window glass 13 and the second visor main body 23*b* of the side visor 21, and this gap can be assuredly closed by matching the width of the sealing portion 33 with the gap between the side window glass 13 and the second visor main body 23*b*. As a result, the gap between the side window glass 13 and the second visor main body 23*b* can be assuredly closed, thereby effectively preventing an air current transmitted through the outer side of the window glass 13 from entering the car.

<Fifth Embodiment>

FIGS. 4 and 8 show a fifth embodiment according to the present invention. In the drawings, like reference numerals denote components equal to those in the foregoing embodiments, thereby eliminating a tautological description.

As shown in FIG. 8, a vehicle side visor cover 111 in this embodiment is attached on a vehicle side visor 121 provided along a window frame 14 of a front door 11 as well as a window frame 18 of a rear door 16. The side visor 121 of this rear door 16 comprises a second horizontal portion 122 which covers a substantially horizontal upper part 18*a* of the rear window frame 18 from the outside of the vehicle and a second inclined portion 123 which is formed to be continuous with the second horizontal portion 122 and covers an inclined rear part 18*b* of the rear window frame 18 from the outside of the vehicle, and a cover attachment portion 112 of the side visor cover 111 can be attached on a lower outer surface of the second horizontal portion 122. Additionally, a tabular sealing portion 113, the inner rim of which faces a rolled-up window glass 17 of the door 16, has an outer rim which is integrally connected with a lower edge of the cover attachment portion 112, and an elastic material 114 formed to come into contact with an outer surface of the rolled-up window glass 17 of the door 16 is attached at the inner rim of the sealing portion 113. Further, a lamp 116 is attached at a rear part of the cover attachment portion 112 in such a manner that it can be visually recognized from the outside of the vehicle 10. The lamp 116 attached in this example is the same as the lamp 36 used in the foregoing embodiments, thereby eliminating the repeated explanation thereof. Although not shown, a lead wire which supplies power to this lamp 116 is connected with a sidemarker lamp.

In the thus configured vehicle side visor cover 111, it is possible to prevent air in the vehicle sucked from a gap between a front part 14*a* of the window frame 14 of the front door 11 and the rolled-down window glass 13 from flowing toward the rear side of the vehicle 10 together with air outside the vehicle which flows during traveling of the vehicle and again entering the vehicle from a gap between a front part 18*a* of the window frame 18 of the rear door 16 and the slightly rolled-down window glass 17. That is, the air sucked through the gap generated between the front part 14*a* and the window glass 13 is transmitted through the outer side of the window glass 13 to upwardly flow, and reaches the outer surface of the window glass 17 of the rear door 16. However, the side visor cover 111 according to the present invention is attached on the second horizontal portion 122 of the side visor 121 attached on the rear door 16, the sealing portion 113 covers the second horizontal portion 122 from the lower side, and the elastic body 114 attached at the inner rim of the sealing portion 113 comes into contact with the window glass 17 to close the gap produced between the upper part 18*a* of the window frame 18 and the window glass 17. Therefore, an air current transmitted through the outer side of the window glass 17 does not again enter the vehicle through this gap.

It is to be noted that the description has been given as to the example where the lamp 116 is attached at the rear part of the cover attachment portion 112 in the fifth embodiment, but the lamp 116 is not necessarily required and does not have to be provided. Further, in case of providing the lamp 116, the lamp 116 may be attached at the center of the cover attachment portion 112 as shown in FIG. 5, and the lamp 116 may be attached at a front part of the cover attachment portion 112 as shown in FIG. 6.

Furthermore, although the description has been given as to the example where the cover attachment portion 112 of the side visor cover 111 can be attached on the lower outer surface of the second horizontal portion 122 in the foregoing embodiment, the cover attachment portion 112 of the side visor cover 111 may be attached on the lower outer surface of the second inclined portion 123.

<Sixth Embodiment>

FIGS. 10 and 11 show a sixth embodiment according to the present invention. In the drawings, like reference numerals denote components equal to those in the foregoing embodiments, thereby eliminating the tautological explanation.

As shown in FIG. 10, a vehicle side visor cover 131 in this embodiment is attached on a vehicle side visor 121 provided along a window frame 18 of a rear door 16, and a cover attachment portion 132 of the side visor cover 131 can be attached on a lower outer surface of a second inclined portion 123. Further, a horizontal cover 137 which can be attached on an outer surface of a second horizontal portion 122 of the vehicle side visor 121 is integrally formed with the cover attachment portion 132. On the other hand, a tabular sealing portion 133, the inner rim of which faces a rolled-up window glass 17 of the door 16, has an outer rim which is integrally connected with a lower edge of this cover attachment portion 132, and an elastic material 134 formed to come into contact with the outer surface of the rolled-up window glass 17 of the door 16 is attached at the inner rim of the sealing portion 133.

A lamp 116 is attached at a rear part of the cover attachment portion 132 in such a manner that it can be visually recognized from the outside of a vehicle 10. Since the lamp 116 attached in this example is the same as the lamp 36 utilized in the foregoing embodiments, thereby eliminating the tautological explanation thereof. A lead wire which supplies power to this lamp 116 is arranged on inner surfaces of the horizontal cover 137 and the cover attachment portion 132 facing the vehicle side visor 121. Giving a concrete description, a concave groove which is continuous in a longitudinal direction is formed on the inner surfaces of the horizontal cover 137 and the cover attachment portion 132 facing the vehicle side visor 121, and the coated lead wire is arranged in this concave groove. Furthermore, the other end of the lead wire protrudes from a front end of the horizontal cover 137, and is led into the car to be connected with a sidemarker lamp.

In the vehicle side visor cover 131 having such a configuration, air in the car sucked from a gap between a front part 14a of a window frame 14 of a front door 11 and a rolled-down window glass 13 is upwardly transmitted through an outer part of the window glass 13, and reaches an outer surface of the window glass 17 of the rear door 16. However, the side visor cover 131 according to the present invention is attached on the side visor 121 disposed to the rear door 16, the sealing portion 133 covers the second inclined portion 123 from the lower side, and the elastic body 134 attached on the inner rim of the sealing portion 133 comes into contact with the window glass 17 to close the gap produced between an upper part 18a of the window frame 18 and the window glass 17. Therefore, an air current transmitted through the outer part of the window glass 17 can be prevented from again entering the car through this gap.

On the other hand, in a state where the side visor cover 131 is attached on the side visor 121, since the coated lead wire is covered with the horizontal cover 137 and the cover attachment portion 132, the lead wire does not appear outside the vehicle 10, thereby improving the external appearance of the vehicle 10.

It is to be noted that the description has been given as to the example where the lamp 116 is attached at the rear part of the cover attachment portion 132 in such a manner that the lamp 116 can be visually recognized from the outside of the vehicle 10 in the sixth embodiment, but the lamp 116 is not necessarily required and may not be provided. Moreover, in case of providing the lamp 116, the lamp 116 may be attached at the front part of the cover attachment portion 132 as shown in FIG. 12, and the lamp 116 may be attached on the horizontal cover 137 as shown in FIG. 13. Additionally, the lead wire which supplies power to the lamp 116 may be arranged on the inner surface of one of the horizontal cover 137 and the cover attachment portion 132.

Further, although the description has been given as to the example where the cover attachment portion 132 of the side visor cover 131 can be attached on the lower outer surface of the second inclined portion 123 in the sixth embodiment, the cover attachment portion 132 of the side visor cover 131 may be configured to be attached on the lower outer surface of the second horizontal portion 122.

Furthermore, although the description has been given as to the example where the lamp 116 is attached on the cover attachment portion 132 or the horizontal cover 137 in the fifth and sixth embodiments, the lamp 116 may be attached on the cover portion 113 or 133 as shown in FIGS. 18 to 21. Here, FIG. 18 shows an example where the lamp 116 is attached at a front part of the cover portion 113, and FIG. 19 shows an example where the lamp is attached at a rear part of the cover portion 113. The side visor cover 131 shown in FIGS. 20 and 21 has a configuration in which the horizontal cover 137 which can be attached on the outer surface of the second horizontal portion 122 of the vehicle side visor 121 is integrally formed with the cover attachment portion 132, and FIG. 20 shows an example where the lamp 116 is attached at the front part of the cover portion 133 whilst FIG. 21 shows the example where the lamp 116 is attached at the rear part of the cover portion 133.

Moreover, although the description has been given as to the lamp 36 comprising the lamp cover 37 and the lamp body 38 in the first to sixth embodiments, as shown in FIG. 24, a lamp 144 may comprise a lamp body 147 detachably disposed to a socket 146 and a lamp cover 148 separably attached in a concave portion 32d, the socket 146 being attached to the concave portion 32d formed in the cover attachment portion 32 or the like. The illustrated lamp body 147 is a rod-like electric bulb having terminals 147a and 147a at both ends thereof, and the socket 146 in which this electric bulb 147 is attached has a pair of support plates 146a and 146a which are electrically connected with the terminals 147a and 147a and hold the electric bulb 147. Holes 146b and 146b in which the terminals 147a and 147a are inserted are formed in the support plates 146a and 146a, the electric bulb 147 is detachably disposed in the socket 146 by tilting the support plates 146a and 146a and inserting the terminals 147a and 147a into the respective holes 146b and 146b.

The lamp cover 148 is produced by molding a translucent resin, and formed in a curve to bulge toward the sides of the vehicle in such a manner that it is elongated in accordance with the horizontally long concave portion 32d and covers the lamp body 147 attached in the socket 146 from the front surface. Attachment holes 148a and 148a are respectively formed at both ends of the lamp cover 148, and a pair of cylindrical bosses 32f and 32f are provided in the concave portion 32d facing the attachment holes 148a and 148a so as to hold the socket 146. Tapping screws 149 and 149 are inserted into the attachment holes 148a and 148a, the lamp cover 148 is separably disposed in the concave portion 32d by screwing the screws 149 and 149 in the bosses 32f and 32f so that the lamp body 147 is covered together with the socket 146 in an attached state.

BRIEF DESCRIPTION OF THE DRAWINGS

FIG. 1 is a cross-sectional view showing a vehicle having a side visor cover according to the first embodiment of the present invention taken along an A—A line in FIG. 8.

FIG. 2 is an exploded perspective view showing a state where a lamp is attached on the side visor cover.

FIG. 3 is a cross-sectional view taken along a line B—B in FIG. 8.

FIG. 4 is a side view showing the side visor cover with a lamp being attached at a rear part of a cover attachment portion.

FIG. 5 is a side view showing the side visor cover with the lamp being attached at a central part of the cover attachment portion.

FIG. 6 is a side view showing the side visor cover with the lamp being attached at a front part of the cover attachment portion.

FIG. 7 is a perspective view of a vehicle having the side visor cover according to the first embodiment.

FIG. 8 is a side view of the vehicle.

FIG. 9 is a cross-sectional view showing a vehicle having a side visor cover according to the second embodiment of the present invention taken along a line C—C in FIG. 10.

FIG. 10 is a side view of a vehicle having the side visor cover according to the second embodiment.

FIG. 11 is a side view of the side visor cover with a lamp being attached at a rear part.

FIG. 12 is a side view of the side visor cover with the lamp being attached at a central part.

FIG. 13 is a side view of the side visor cover with the lamp being attached at a front part.

FIG. 14 is a view showing a side visor on which a side visor cover having a flap according to the third embodiment of the present invention is attached.

FIG. 15 is a cross-sectional view taken along a D—D line in FIG. 14, in which the flap is placed at a first position.

FIG. 16 is a cross-sectional view corresponding to FIG. 15, in which the flap is placed at a second position.

FIG. 17 is a cross-sectional view showing a vehicle having a side visor cover with a lamp being provided to a sealing portion according to the fourth embodiment of the present invention taken along a line E—E in FIG. 18.

FIG. 18 is a side view of the side visor cover with the lamp being attached at a front part of the sealing portion.

FIG. 19 is a side view of the side visor cover with the lamp being attached at a rear part of the sealing portion.

FIG. 20 is a side view showing a configuration in which the lamp is attached at the front part of the sealing portion of the side visor cover having an inclined upper cover and others.

FIG. 21 is a side view showing a configuration in which the lamp is attached at the rear part of the sealing portion of the side visor cover.

FIG. 25 is a cross-sectional view of a conventional side visor.

Figure 22:
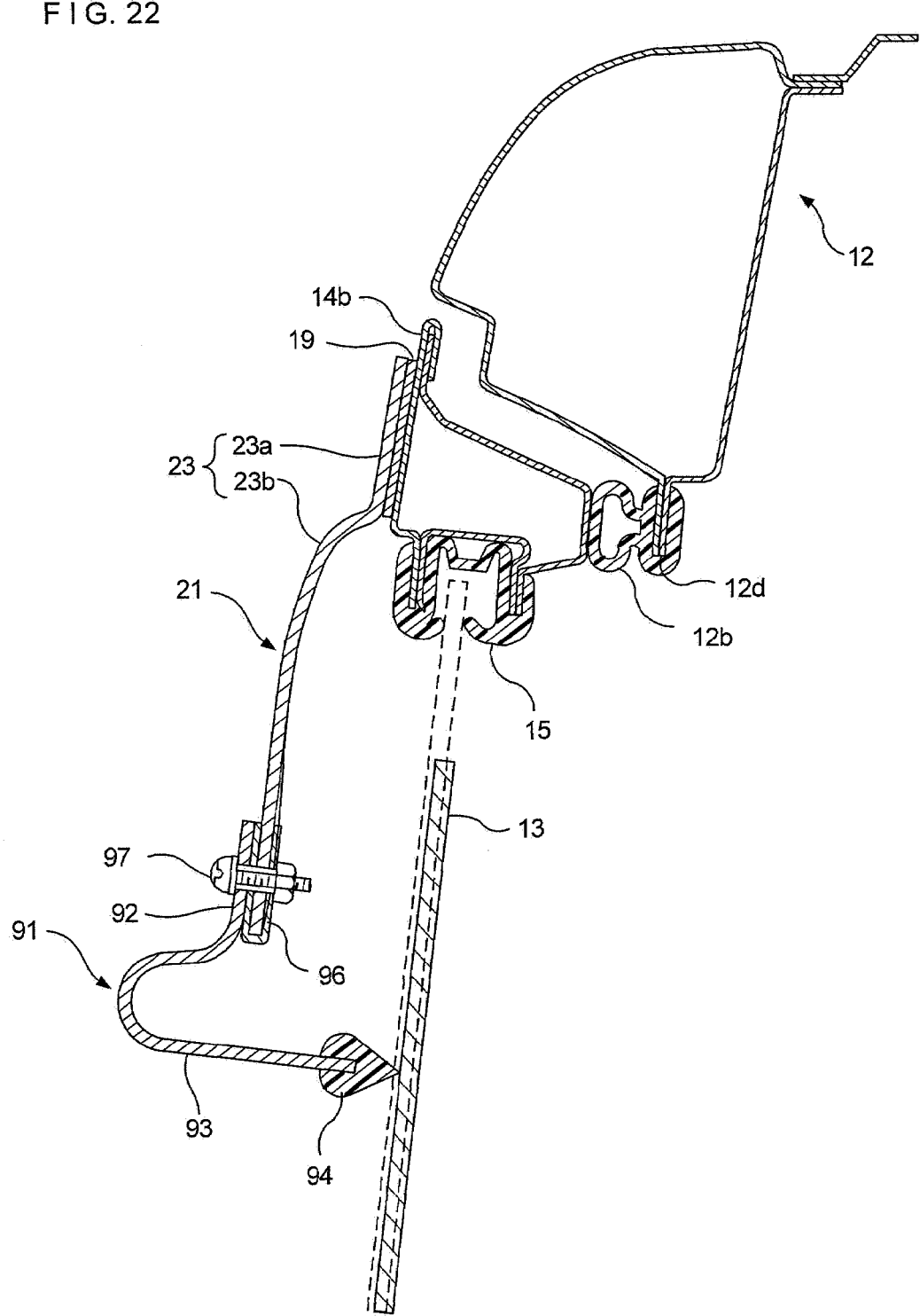
FIG. 22 is a cross-sectional view corresponding to FIG. 1, showing a configuration in which a cover attachment portion is disposed through a clip.
Figure 23:
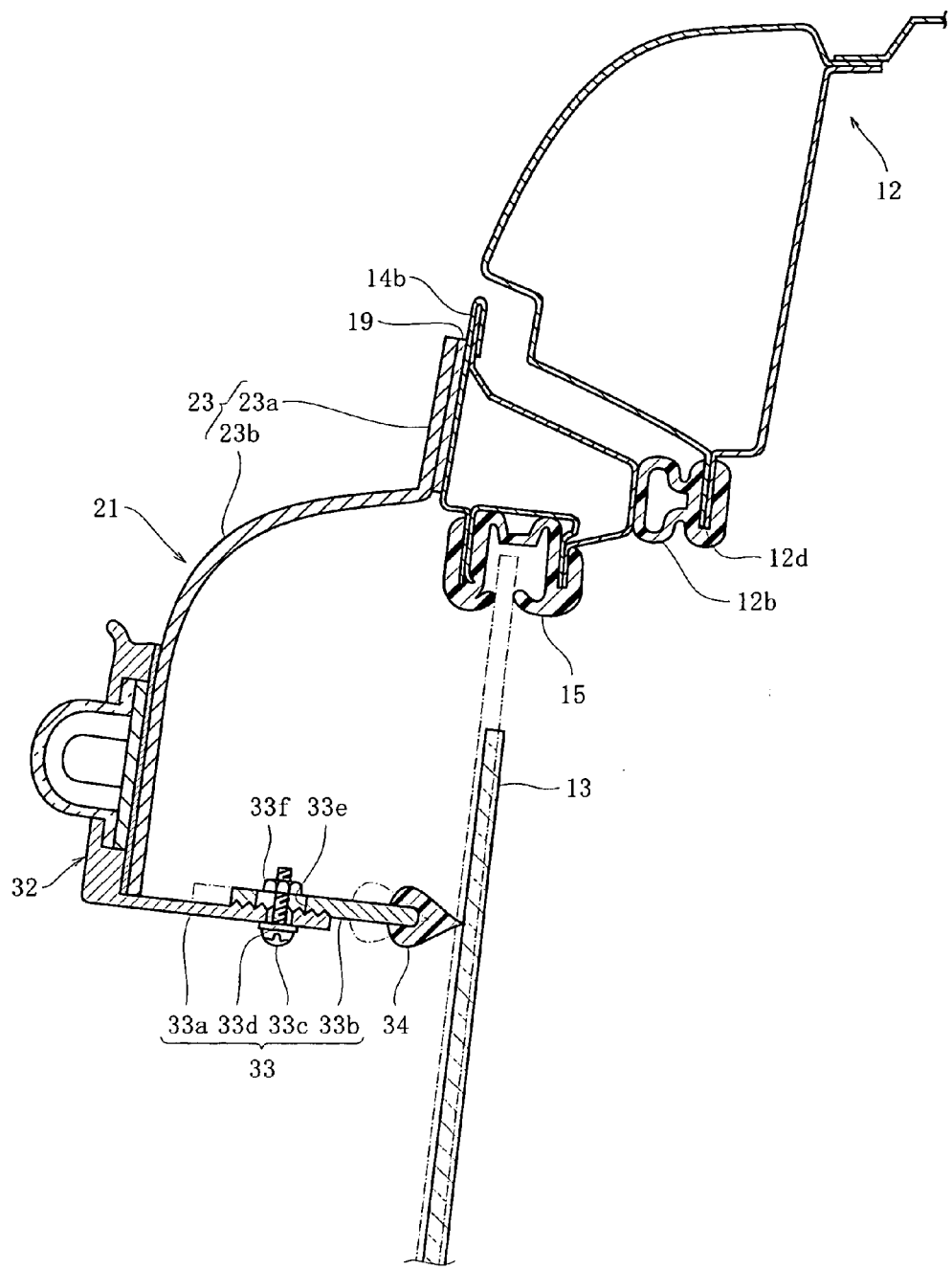
FIG. 23 is a cross-sectional view corresponding to FIG. 1, showing a configuration in which the sealing portion comprises first and second sealing plates.
Figure 24:
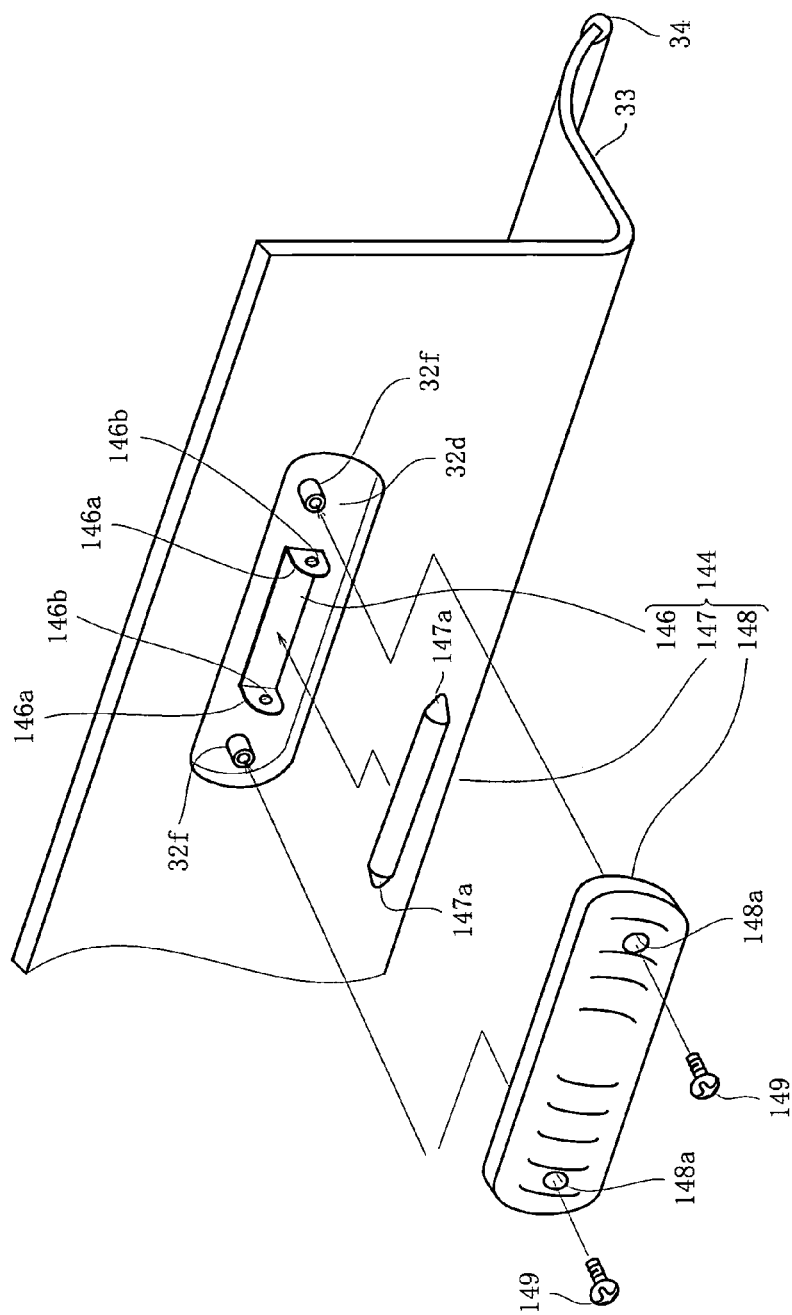
FIG. 24 is a perspective view corresponding to FIG. 2, showing a configuration of another lamp.

EXPRESSION OF REFERENCE LETTERS 10 vehicle
11 front door (vehicle door)
13, 17 window glass
14 front window frame
14a front part
14b upper part
16 rear door (vehicle door)
18 rear window frame
18a upper part
18b rear part
21 vehicle side visor
22 first inclined portion
23 first horizontal portion
31, 61, 71, 81, 91, 111, 131 side visor cover
32, 62, 72, 82, 92, 112, 132 cover attachment portion
33, 63, 73, 83, 93, 113, 133 sealing portion
34, 64, 74, 84, 94, 114, 134 elastic material
33a first sealing plate
33b second sealing plate
32a rain receiving groove
36 lamp
66 horizontal rear cover
67 horizontal upper cover
68 inclined upper cover
69 lead wire
86 reinforcing holding piece
96 clip
76 flap
116 lamp
121 vehicle side visor
122 second horizontal portion
123 second inclined portion
137 horizontal cover

The invention claimed is:

1. A vehicle side visor cover which is attached on a conventionally used vehicle side visor (21, 121) provided along a window frame (14, 18) of a vehicle door (11, 16) to effectively utilize the vehicle side visor (21, 121), the vehicle side visor cover comprising:

a cover attachment portion (32, 62, 72, 82, 92, 112, 132) which can be attached on an outer surface of the side visor (21, 121) and has a lower edge along a lower edge of the side visor (21, 121);

a tabular sealing portion (33, 63, 73, 83, 93, 113, 133) whose outer rim is integrally connected with the lower edge of the cover attachment portion (32, 62, 72, 82, 92, 112, 132) and whose inner rim faces a rolled-up window glass (13, 17) of the door (11, 16); and an elastic material (34, 64, 74, 84, 94, 114, 134) which is attached on the inner rim of the sealing portion (33, 63, 73, 83, 93, 113, 133) and formed to come into contact with an outer surface of the rolled-up window glass (13, 17) of the door (11, 16);

wherein the sealing portion (33) comprises: a first sealing plate (33a) whose outer rim is integrally connected with the lower edge of the cover attachment portion (32) and whose inner rim faces the rolled-up window glass (13) of the door (11); and a second sealing plate (33b) which is superimposed and attached on the first sealing plate (33a) so as to be movable in a car widthwise direction and has an inner rim on which the elastic material (34) is attached.

2. A vehicle side visor cover which is attached on a conventionally used vehicle side visor (21, 121) provided along a window frame (14, 18) of a vehicle door (11, 16) to effectively utilize the vehicle side visor (21, 121), the vehicle side visor cover comprising:

a cover attachment portion (32, 62, 72, 82, 92, 112, 132) which can be attached on an outer surface of the side visor (21, 121) and has a lower edge along a lower edge of the side visor (21, 121);

a tabular sealing portion (33, 63, 73, 83, 93, 113, 133) whose outer rim is integrally connected with the lower edge of the cover attachment portion (32, 62, 72, 82, 92, 112, 132) and whose inner rim faces a rolled-up window glass (13, 17) of the door (11, 16); and an elastic material (34, 64, 74, 84, 94, 114, 134) which is attached on the inner rim of the sealing portion (33, 63, 73, 83, 93, 113, 133) and formed to come into contact with an outer surface of the rolled-up window glass (13, 17) of the door (11, 16);

wherein the sealing portion (33, 63, 73, 83, 93, 113, 133) is formed in a curve in such a manner that it declines and approaches the window glass (13, 17) as getting closer to the rolled-up window glass (13, 17) of the door (11, 16).

3. A vehicle side visor cover which is attached on a conventionally used vehicle side visor (21) provided along a window frame (14) of a vehicle door (11) to effectively utilize the vehicle side visor (21), the vehicle side visor cover comprising:

a cover attachment portion (32, 62, 72, 82, 92) which can be attached on an outer surface of the side visor (21) and has a lower edge along a lower edge of the side visor (21);

a tabular sealing portion (33, 63, 73, 83, 93) whose outer rim is integrally connected with the lower edge of the cover attachment portion (32, 62, 72, 82, 92) and whose inner rim faces a rolled-up window glass (13) of the door (11); and an elastic material (34, 64, 74, 84, 94) which is attached on the inner rim of the sealing portion (33, 63, 73, 83, 93) and formed to come into contact with an outer surface of the rolled-up window glass (13) of the door (11);

wherein the vehicles side visor (21) is provided along the window frame (14) of a front door (11), the side visor (21) of the front door (11) comprises: a first inclined portion (22) which covers an inclined front part (14a) of the front window frame (14) from the outside of a vehicle; and a first horizontal portion (23) which is formed to be continuous with the first inclined portion (22) and covers a substantially horizontal upper part (14b) of the front window frame (14) from the outside of the vehicle, and the cover attachment portion (32, 62, 72, 82, 92) can be attached on a lower outer surface of the first horizontal portion (23); and wherein an upper edge of the cover attachment portion (32, 62, 72, 82, 92) is formed to be smoothly continuous with a lower edge of the first inclined portion (22) of the vehicle side visor (21).

4. A vehicle side visor cover which is attached on a conventionally used vehicle side visor (21) provided along a window frame (14) of a vehicle door (11) to effectively utilize the vehicle side visor (21), the vehicle side visor cover comprising:

a cover attachment portion (32) which can be attached on an outer surface of the side visor (21) and has a lower edge along a lower edge of the side visor (21);

a tabular sealing portion (33) whose outer rim is integrally connected with the lower edge of the cover attachment portion (32) and whose inner rim faces a rolled-up window glass (13) of the door (11); and an elastic material (34) which is attached on the inner rim of the sealing portion (33) and formed to come into contact with an outer surface of the rolled-up window glass (13) of the door (11);

wherein a rain receiving groove (32a) is formed at the upper edge of the cover attachment portion (32) alone or together with the vehicle side visor (21) over an entire length of the cover attachment portion (32).

5. A vehicle side visor cover which is attached on a conventionally used vehicle side visor (21, 121) provided along a window frame (14, 18) of a vehicle door (11, 16) to effectively utilize the vehicle side visor (21, 121), the vehicle side visor cover comprising:

a cover attachment portion (32, 62, 72, 82, 92, 112, 132) which can be attached on an outer surface of the side visor (21, 121) and has a lower edge along a lower edge of the side visor (21, 121);

a tabular sealing portion (33, 63, 73, 83, 93, 113, 133) whose outer rim is integrally connected with the lower edge of the cover attachment portion (32, 62, 72, 82, 92, 112, 132) and whose inner rim faces a rolled-up window glass (13, 17) of the door (11, 16); and an elastic material (34, 64, 74, 84, 94, 114, 134) which is attached on the inner rim of the sealing portion (33, 63, 73, 83, 93, 113, 133) and formed to come into contact with an outer surface of the rolled-up window glass (13, 17) of the door (11, 16);

wherein a lamp (36, 116) which illuminates a lower side is attached on the sealing portion (33, 63, 73, 83, 93, 113, 133).

6. A vehicle side visor cover which is attached on a conventionally used vehicle side visor (21) provided along a window frame (14) of a vehicle door (11) to effectively utilize the vehicle side visor (21), the vehicle side visor cover comprising:

a cover attachment portion (82) which can be attached on an outer surface of the side visor (21) and has a lower edge along a lower edge of the side visor (21);

a tabular sealing portion (83) whose outer rim is integrally connected with the lower edge of the cover attachment portion (82) and whose inner rim faces a rolled-up window glass (13) of the door (11); and an elastic material (84) which is attached on the inner rim of the sealing portion (83) and formed to come into contact with an outer surface of the rolled-up window glass (13) of the door (11);

wherein a reinforcing holding piece (86) which is held at a lower end of the vehicle side visor (21) together with the cover attachment portion (82) is integrally provided at the lower edge of the cover attachment portion (82) or the sealing portion (83).

7. A vehicle side visor cover which is attached on a conventionally used vehicle side visor (21) provided along a window frame (14, 18) of a vehicle door (11, 16) to effectively utilize the vehicle side visor (21), the vehicle side visor cover comprising:

a cover attachment portion (92) which can be attached on an outer surface of the side visor (21) and has a lower edge along a lower edge of the side visor (21);

a tabular sealing portion (93) whose outer rim is integrally connected with the lower edge of the cover attachment portion (92) and whose inner rim faces a rolled-up window glass (13, 17) of the door (11, 16); and an elastic material (94) which is attached on the inner rim of the sealing portion (93) and formed to come into contact with an outer surface of the rolled-up window glass (13, 17) of the door (11, 16);

wherein the cover attachment portion (92) is attached at a lower end of the side visor (21) by being screwed to a clip (96) which allows fitting and has a U-shaped cross section.

8. A vehicle side visor cover which is attached on a conventionally used vehicle side visor (21) provided along a window frame (14) of a vehicle door (11) to effectively utilize the vehicle side visor (21, 121), the vehicle side visor cover comprising:

a cover attachment portion (32, 62, 72, 82, 92) which can be attached on an outer surface of the side visor (21) and has a lower edge along a lower edge of the side visor (21);

a tabular sealing portion (33, 63, 73, 83, 93) whose outer rim is integrally connected with the lower edge of the cover attachment portion (32, 62, 72, 82, 92) and whose inner rim faces a rolled-up window glass (13) of the door (11); and an elastic material (34, 64, 74, 84, 94) which is attached on the inner rim of the sealing portion (33, 63, 73, 83, 93) and formed to come into contact with an outer surface of the rolled-up window glass (13) of the door (11);

wherein the vehicles side visor (21) is provided along the window frame (14) of a front door (11), the side visor (21) of the front door (11) comprises: a first inclined portion (22) which covers an inclined front part (14*a*) of the front window frame (14) from the outside of a vehicle; and a first horizontal portion (23) which is formed to be continuous with the first inclined portion (22) and covers a substantially horizontal upper part (14*b*) of the front window frame (14) from the outside of the vehicle, and the cover attachment portion (32, 62, 72, 82, 92) can be attached on a lower outer surface of the first horizontal portion (23); and wherein a flap (76) is continuously formed at a front end of the cover attachment portion (72) along a lower edge of the first inclined portion (22) of the vehicle side visor on a lower outer surface of the first inclined portion (22), and the flap (76) can be selectively changed to one of a first position at which the entire flap (76) forms substantially the same plane as the first inclined portion (22) and a second position at which a lower end of the flap (76) increases a gap between itself and the first inclined portion (22).

* * * * *